US012421084B2

(12) United States Patent
Morissette et al.

(10) Patent No.: US 12,421,084 B2
(45) Date of Patent: Sep. 23, 2025

(54) POWERED HANDLER WITH AT LEAST ONE PIVOT DISPLACEABLE RELATIVE TO A BODY

(71) Applicant: R.N.P. INDUSTRIES INC., Boisbriand (CA)

(72) Inventors: Danny Morissette, St Colomban (CA); Erick Smith, Blainville (CA)

(73) Assignee: R.N.P. INDUSTRIES INC., Rigaud (CA)

( * ) Notice: Subject to any disclaimer, the term of this patent is extended or adjusted under 35 U.S.C. 154(b) by 589 days.

(21) Appl. No.: 17/653,555

(22) Filed: Mar. 4, 2022

(65) Prior Publication Data

US 2022/0281719 A1 Sep. 8, 2022

Related U.S. Application Data

(60) Provisional application No. 63/157,653, filed on Mar. 6, 2021.

(51) Int. Cl.
*B66C 1/44* (2006.01)
*B66C 1/58* (2006.01)
*B66C 23/72* (2006.01)

(52) U.S. Cl.
CPC ................ *B66C 1/447* (2013.01); *B66C 1/58* (2013.01); *B66C 23/72* (2013.01)

(58) Field of Classification Search
CPC ........... B66C 1/447; B66C 1/58; B66C 23/72; B66C 1/427; B66C 13/08
(Continued)

(56) References Cited

U.S. PATENT DOCUMENTS 2,763,229 A * 9/1956 Sahlin .................. B21D 43/105 100/215
2,910,321 A * 10/1959 Sehn .................... B21D 43/057 294/197
2,943,750 A * 7/1960 Sehn et al. .................... 164/404
(Continued)

FOREIGN PATENT DOCUMENTS

CN 211362277 1/2019

OTHER PUBLICATIONS

Anver Corp. "Vacuum Rotators and Sidegrips," 2016, https://anver.com/vacuum-lifters/vacuum_rotators_and_sidegrips/?r=1 accessed Jun. 17, 2024 (Year: 2016).*
(Continued)

*Primary Examiner* — Gerald McClain
(74) *Attorney, Agent, or Firm* — NORTON ROSE FULBRIGHT CANADA LLP

(57) ABSTRACT

A powered handler for handling a workpiece, comprising a body extending between a first and a second end, an input device adjacent the first end, a handling implement adjacent the second end, the handling implement operatively connected to the input device and operable to handle the workpiece, and a suspender having a proximate end mounted to the body at at least one pivot of the suspender defining a pitch axis of the powered handler, the body pivotable relative to the suspender about the pitch axis, the at least one pivot disposed between the input device and the handling implement and displaceable relative to the body to a balanced position located between a first and a second position closer to the second end than the first position, the suspender having a distal end spaced upwardly from the body for mounting the suspender to suspend the body from the suspender.

14 Claims, 11 Drawing Sheets

(58) Field of Classification Search
USPC .............. 414/739; 294/197, 198, 106, 81.54, 294/67.33, 81.3, 67.5
See application file for complete search history.

(56) References Cited

U.S. PATENT DOCUMENTS

| | | | | | |
|---|---|---|---|---|---|
| 3,596,968 | A * | 8/1971 | Holm | B66C 1/10 | 294/81.4 |
| 3,732,989 | A * | 5/1973 | Cagle | F15B 11/20 | 414/740 |
| 3,762,755 | A * | 10/1973 | Saether | B66C 1/105 | 294/67.5 |
| 4,318,562 | A * | 3/1982 | Tompkins | C03B 5/167 | 432/235 |
| 4,426,110 | A | 1/1984 | Mitchell et al. | | |
| 4,428,710 | A * | 1/1984 | Grisebach | B25J 15/022 | 901/29 |
| 4,557,659 | A * | 12/1985 | Scaglia | B66C 1/0243 | 254/270 |
| 5,088,610 | A * | 2/1992 | Garnier | B25J 13/088 | 212/196 |
| 5,791,861 | A * | 8/1998 | Seelig | B65G 47/91 | 294/185 |
| 7,017,963 | B1 * | 3/2006 | Setzke | B66C 1/105 | 294/67.5 |
| 7,891,718 | B2 * | 2/2011 | Heinaman | B66C 1/105 | 414/469 |
| 8,000,835 | B2 * | 8/2011 | Friz | B66C 13/08 | 294/67.5 |
| 9,061,868 | B1 * | 6/2015 | Paulsen | B66C 1/0218 | |
| 10,106,376 | B2 * | 10/2018 | Del Pozo Polidoro | B66C 1/10 | |
| 11,577,660 | B1 * | 2/2023 | Huang | B60R 9/10 | |
| 2021/0229960 | A1 * | 7/2021 | Ragnarsson | B66C 13/14 | |

OTHER PUBLICATIONS

Anver Corporation, "Vacuum Tube Lifting Systems," Nov. 22, 2004 (http://www.irsindustriescom/assets/anver.pdf), 36 pages. (Year: 2004).*

* cited by examiner

POWERED HANDLER WITH AT LEAST ONE PIVOT DISPLACEABLE RELATIVE TO A BODY

CROSS-REFERENCE TO RELATED APPLICATIONS

This application claims priority of U.S. provisional patent application No. 63/157,653 filed Mar. 6, 2021, the entire contents of which are incorporated by reference herein.

TECHNICAL FIELD

The application relates generally to handlers and, more particularly, to powered handlers.

BACKGROUND

Modern developments in industrial ergonomics have led to various degrees of mechanization of laborious or hazardous manoeuvers traditionally performed by hand. This trend is observable in so-called traditional industries such as manufacturing, construction and transportation, in which the handling of large, heavy or otherwise cumbersome items is ubiquitous. Several highly specialized industrial settings also lend themselves to powered assistance. For instance, ground exploration in the mining industry comprises drilling holes in the ground to retrieve core samples that will be subjected to mineralogical analysis. Long-reach drilling machines are used to explore the ground for mineral formations located at important depths from the ground surface or even from within a mine shaft. This exploration is accomplished by drilling boreholes that can be about 5000 meters long (about 16 400 feet long) to attain the location of the desired core sample. To drill such boreholes, the drilling machines drive a hollow drill string composed of end-to-end drill rods spearheaded by a core bit. The deeper the borehole, the more drill rods are needed. As the length of the borehole increases, drill rods are sequentially attached to each other in end-to-end fashion to form the drill string. Conversely, as the drill string is retrieved from the borehole upon completion of the ground exploration, each drill rod is sequentially detached from a remainder of the drill string. Although drill rod sizes vary depending on the application, they are generally long and heavy, such that their repeated handling required to carry out a ground exploration is a taxing endeavour.

SUMMARY

There is disclosed a powered handler for handling a workpiece, the powered handler comprising: a body extending between a first end and a second end; an input device adjacent the first end of the body; a handling implement adjacent the second end of the body, the handling implement operatively connected to the input device and operable to handle the workpiece; and a suspender having a proximate end mounted to the body at at least one pivot of the suspender defining a pitch axis of the powered handler, the body pivotable relative to the suspender about the pitch axis, the at least one pivot disposed between the input device and the handling implement and displaceable relative to the body to a balanced position located between a first position and a second position closer to the second end than the first position, the suspender having a distal end spaced upwardly from the body for mounting the suspender so as to suspend the body from the suspender.

There is disclosed a powered handling system comprising a powered handler, further comprising a positioning device including a base, at least one positioning link movably joined to the base and a positioning effector connected to the at least one positioning link, the positioning effector controllably positionable relative to the base via the at least one positioning link, the distal end of the suspender mounted to the positioning effector such that the powered handler is controllably positionable relative to the base.

There is disclosed a method for handling a workpiece, the method comprising: displacing a handling implement with a powered assistance toward the workpiece, the handling implement being balanced about at least a pitch axis during displacement; and displacing the handling implement together with the workpiece using the powered assistance, the handling implement and the workpiece being balanced about at least the pitch axis.

DESCRIPTION OF THE DRAWINGS

Reference is now made to the accompanying figures in which:

FIG. 9 is a close-up view of the clamp of FIG. 8, with the clamp shown in a first closed clamp position;

DETAILED DESCRIPTION

Figure 1:
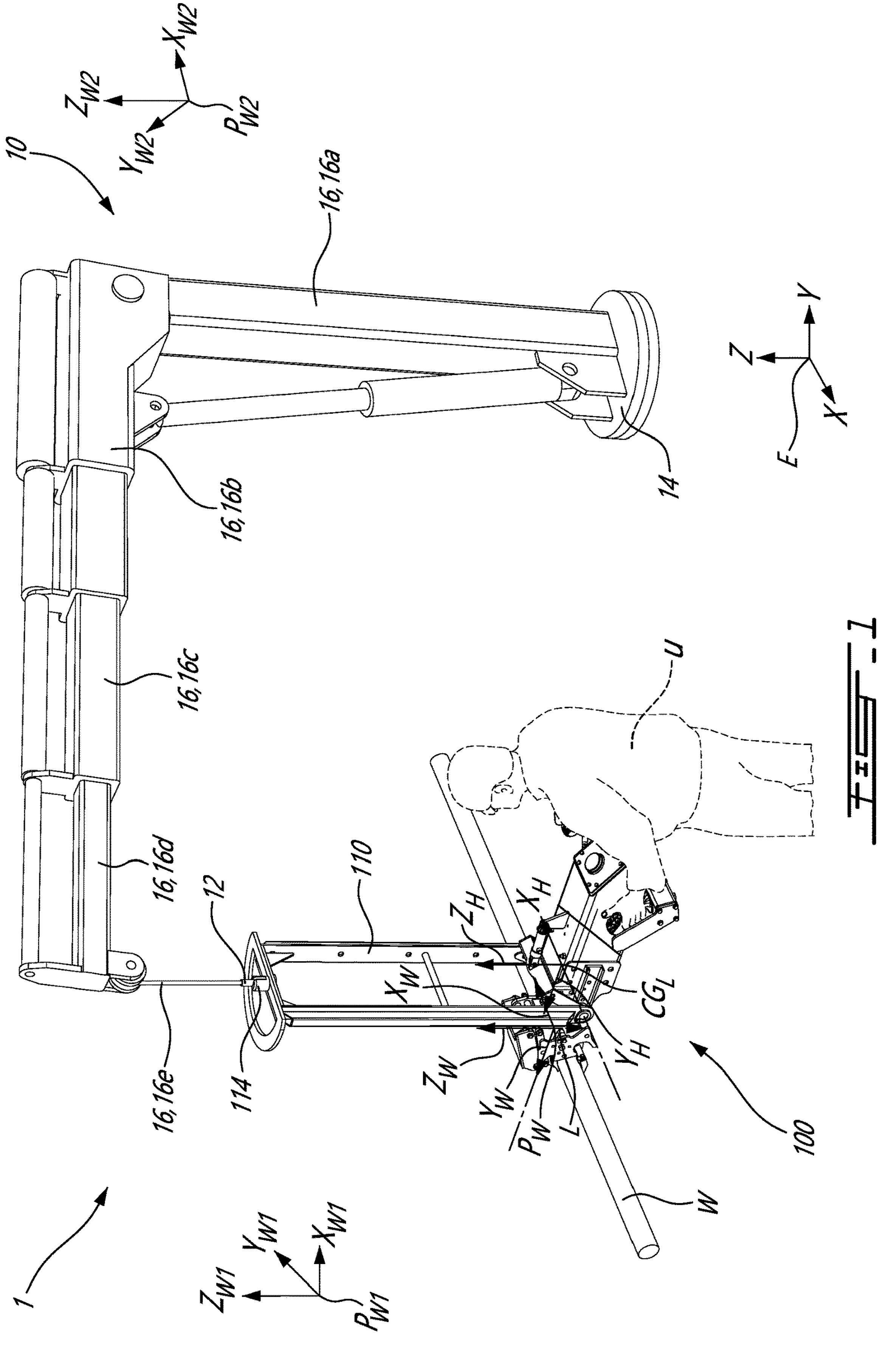
FIG. 1 is a perspective view of a handling system.

Referring to FIG. 1, a powered handling system 1 (sometimes referred to herein simply as "the handling system 1") that generally includes a suspension means 10 provided in the form of a positioning device 10 and a powered handler 100 (sometimes referred to herein simply as "the handler 100") mounted to the positioning device 10 so as to be suspended above the ground. The "powered" qualifier is intended to evoke that the handler 100 is a powered device which, upon being suitably suspended, can mechanically assist a user U in supporting and maneuvering a workpiece W within a tri-dimensional work environment E (defined by axes X, Y and Z). The handler 100 may also be described as "semi-assisted", in that it may be operated by the user U to perform work with or without powered assistance depending on the situation.

The handling system 1 is provided for displacing the workpiece W between a first workpiece position $P_{w1}$ (defined by axes $X_{w1}$, $Y_{w1}$, $Z_{w1}$) and a second workpiece position $P_{w2}$ (defined by axes $X_{w2}$, $Y_{w2}$, $Z_{w2}$) within the work environment E. In FIG. 1, the handling system 1 is shown being operated by the user U to displace the workpiece W, in this case a drill rod shown at a transitory position $P_w$ (defined by axes $X_w$, $Y_w$, $Z_w$), from the first workpiece position Pw1 to the second workpiece position $P_{w2}$. Here, the first workpiece position $P_{w1}$ is defined by a storage location which may be at a certain vertical distance relative to the ground, such as on a storage rack, or may even simply be on the ground. The second workpiece position $P_{w2}$ is at a location suitable for the workpiece W to be handed over or put to use. Here, the second workpiece position $P_{w2}$ corresponds to a position suitable for the workpiece W to be added to or removed from a drill string that is operatively connected to a drilling machine. In displacing the workpiece W from the first workpiece position $P_{w1}$ to the second workpiece position $P_{w2}$ or vice versa, the workpiece W may need to be translated and/or rotated relative to one or more of the axes X, Y Z, for example to account for differences between the first and second workpiece positions $P_{w1}$, $P_{w2}$ or to avoid obstacles present in the work environment E. As will become apparent from the forthcoming description, the handling system 1 provides such maneuverability.

The suspension means 10 generally includes a suspension mount 12 via which the handler 100 is mounted to the suspension means 10. In some embodiments, the suspension means 10 is a bridge crane and the suspension mount 12 is at a distal end of a cable or a chain of a winch-like device supported by the bridge crane. It is also contemplated that in some implementations, the suspension means 10 may merely be a fixture defining the suspension mount 12 and depending from a ceiling or other overhead structure. As indicated hereinabove, in the depicted embodiment, the suspension means 10 is provided in the form of the positioning device 10 and as such, the suspension mount 12 can be referred to as a positioning effector 12 of the positioning device 10. The positioning device 10 also includes a base 14 and at least one positioning link 16 movably joined to the base 14. The positioning effector 12 is controllably positionable relative to the base 14 via the at least one positioning link 16. Stated otherwise, the at least one positioning link 16 is one or more member(s), or mast(s), articulated relative to the base 14 and which may be spatially arranged relative to one another so as to selectively position the positioning effector 12 within the work environment E. Hence, the positioning device 10 may be said to allow coarse positioning of the handler 100 within the work environment E. In this exemplary embodiment, the positioning device 10 is of a type generally referred to as a boom crane. The at least one positioning link 16 includes a column 16*a* rotatable relative to the base 14 about a vertical positioning axis parallel to the Z axis, a telescopic boom 16*b*, 16*c*, 16*d* having a first boom end and a second boom end, and a distal positioning link 16*e* extending from the second boom end to the positioning effector 12. The first boom end is pivotally joined to the column 16*a* so as to be pivotable about a horizontal positioning axis perpendicular to the vertical positioning axis, and the second boom end is slidably joined to the first boom end. In an embodiment, the distal positioning link 16*e* has an effective length, i.e., a distance between the second boom end and a free end of the distal positioning link 16*e* connected to the positioning effector 12, that is variable. Indeed, the distal positioning link 16*e* may be provided in the form of a flexible cable that may in some cases be unwound or unspooled to increase the effective length, or wound or spooled to decrease the effective length. In other embodiments, the distal positioning link 16*e* may have a fixed effective length. In such embodiments, the distal positioning link 16*e* includes a rigid member. In embodiments, the distal positioning link 16*e* includes one or more of a flexible cable, a rigid member and a rotational joint, the latter allowing the handler 100 to be pivoted about a vertical axis parallel to the axis Z. It shall be understood that various other arrangements of the positioning device 10 are possible, so long as they are suitable for cooperating with the handler 100 consistent with the forthcoming description thereof.

Figure 3:
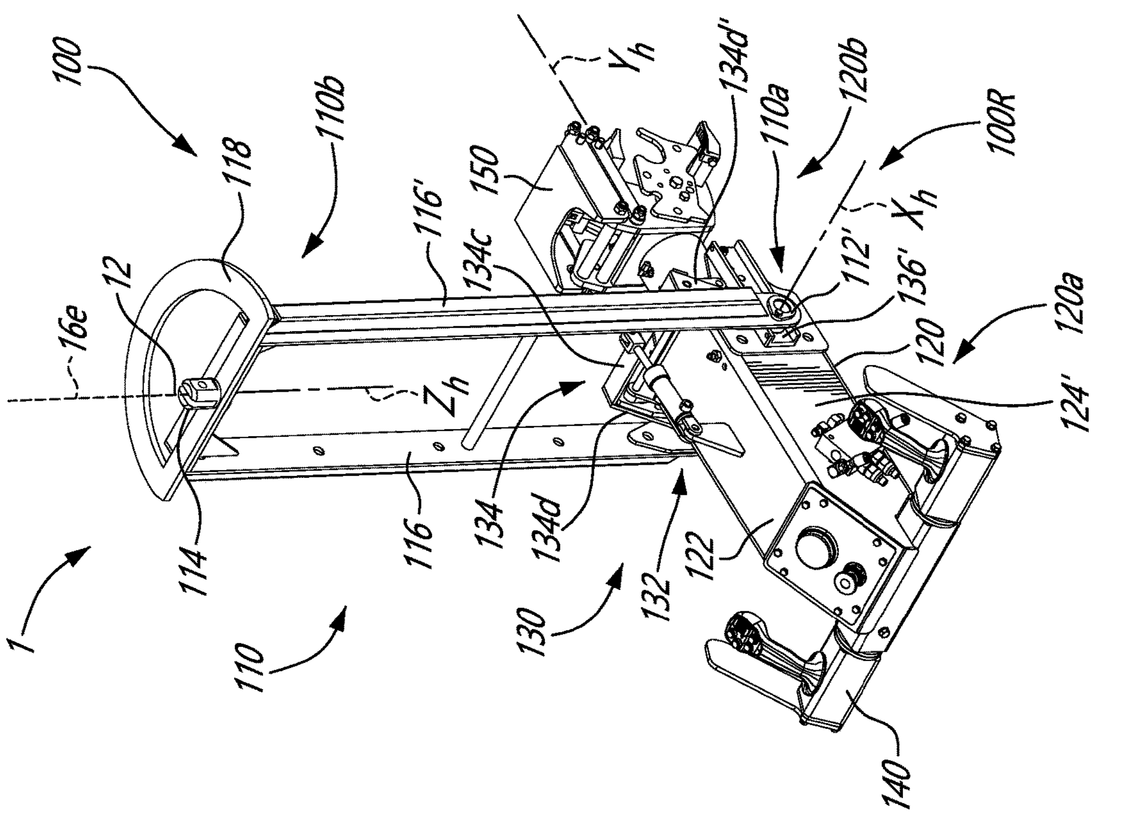
FIG. 3 is a perspective view of the powered handler of FIG. 2.
Figure 2:
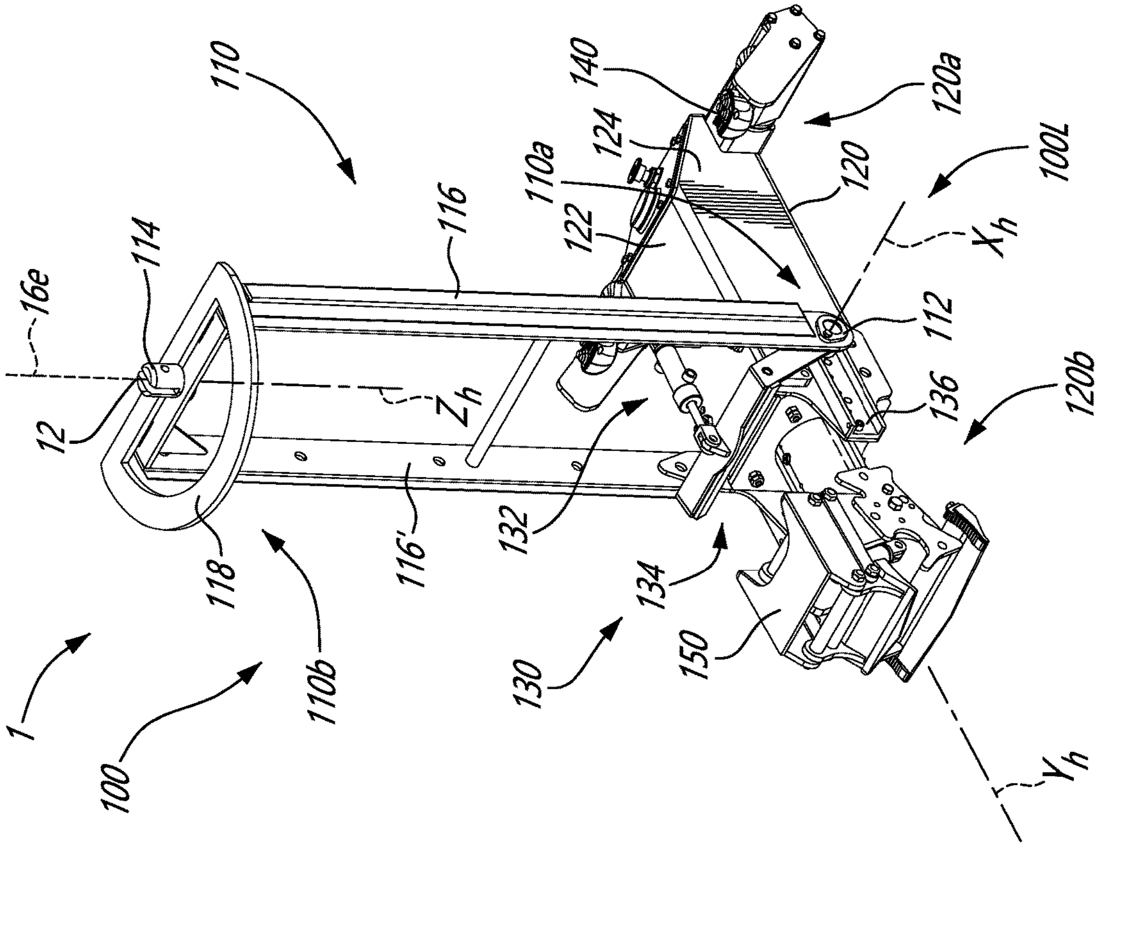
FIG. 2 is a perspective view of a powered handler of the handling system of FIG. 1.
Figure 4:
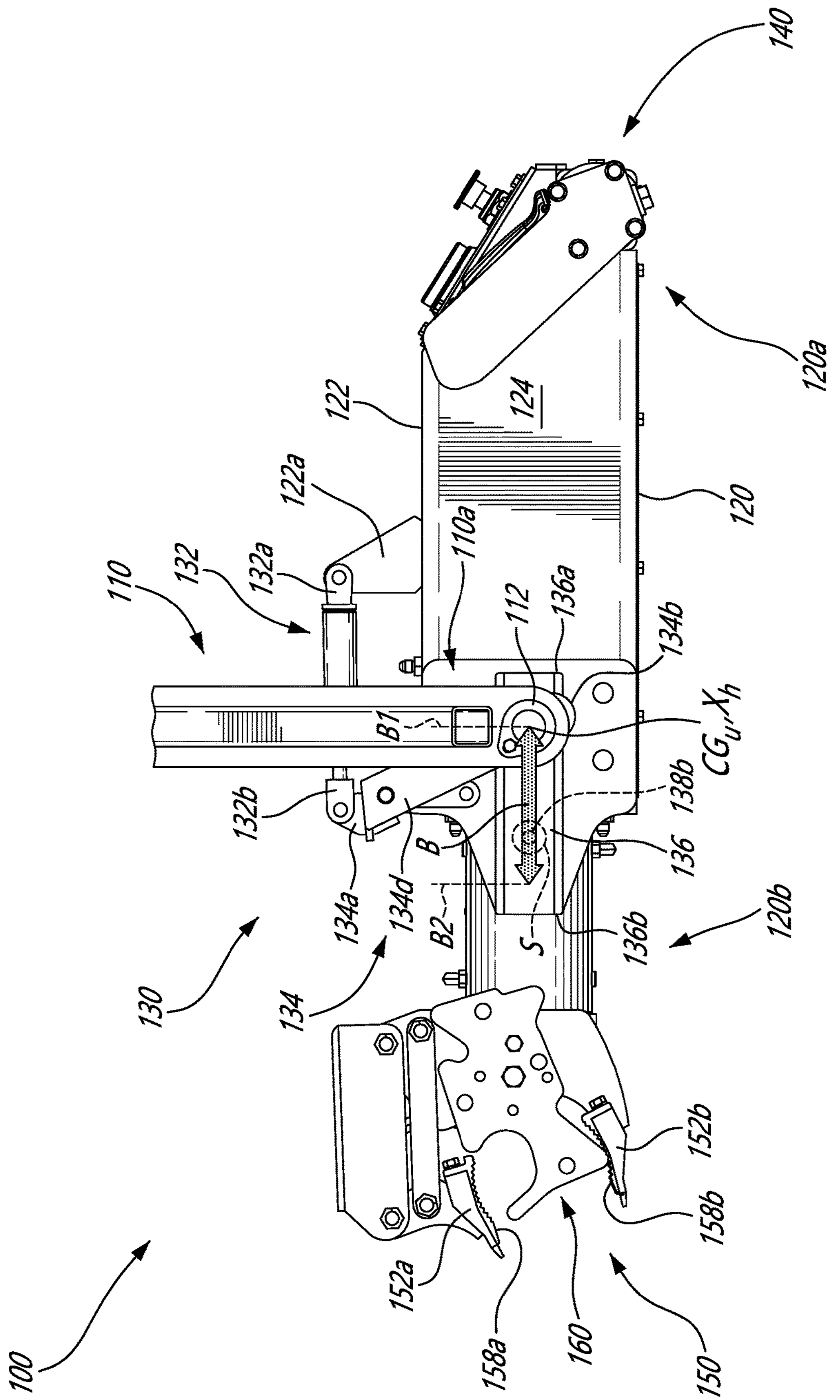
FIG. 4 is a side elevation view of the powered handler of FIG. 2.

Referring to FIGS. 2 to 4, the handler 100 includes a suspender 110 via which the handler 100 is mounted to the positioning device 10, an elongated body 120 that is pivotally suspended by the suspender 110 at a location between opposite first and second body ends 120*a*, 120*b* of the body 120, and a balancing mechanism 130 operatively connected between the body 120 and the suspender 110. The handler 100 also includes an input device 140 located at the first body end 120*a*, and a handling implement 150 located at the second body end 120*b*. The body 120, the balancing mechanism 130, the input device 140 and the handling implement 150 may be referred to as the suspended portion of the handler 100. The suspender 110 has a suspender pivot 112 defining a pitch axis Xh about which the suspended portion is pivotable relative to the suspender 110.

As will be described in greater detail hereinbelow, the balancing mechanism 130 is configured for balancing the suspended portion of the handler 100 relative to the suspender 110. Such balancing is achieved as a result of the suspender pivot 112 (and hence the pitch axis Xh) being positioned relative to the body 120 (and hence relative to the input device 140 and to the handling implement 150) within a range of balancing positions B (FIG. 4) corresponding to various possible loading conditions of the handler 100. In a so-called unloaded balanced position of the range of balancing positions B, a first weight distribution inclusive of the suspended portion from the input device 140 up to the pitch axis Xh, neutralizes a second weight distribution inclusive of the suspended portion from the handling implement 150 up to the pitch axis Xh. Depending on a weight of the workpiece W to be supported by the handling implement 150, the suspender pivot 112 can be displaced to a corresponding loaded position of the range of balancing positions B to bring the handling implement 150 closer to the pitch axis Xh, and thus bring the input device 140 further from the pitch axis Xh, such that the so extended first weight distribution neutralizes the so shortened second weight distribution, the latter now inclusive of the weight of the workpiece W. Provided that the suspender pivot 112 is in a position of the range of balancing positions B that is suitable for the loading conditions in effect, the suspended portion is balanced relative to the suspender 110, i.e., is not gravitationally biased to pivot relative to the suspender 110. Such absence of gravitational bias may be referred to as "zero-G" loading conditions, under which the user U may hold the suspended portion of the handler 100 via the input device 140 in complete or near-complete weightlessness, regardless of the orientation of suspended portion about the pitch axis Xh.

Still referring to FIGS. 2 to 4, components of the handler 100 will now be described in greater detail. The suspender 110 is an elongated structure of the handler 100 extending between a proximal suspender end 110*a* (i.e., an end proximate to the body 120) connected to the body 120 and a distal suspender end 110*b* (i.e., an end remote from the body 120).

The suspender pivot 112 is located at the proximal suspender end 110*a*, and defines the pitch axis Xh of the handler 100. The body 120 is pivotally suspended via the suspender pivot 112 so as to be pivotable relative to the suspender 110 about the pitch axis Xh. At the distal suspender end 110*b*, the suspender 110 has a mounting interface 114 via which the handler 100 is mountable to the positioning effector 12 of the positioning device 10. The mounting interface 114 is located about a yaw axis Zh of the handler 100. The body 120 extends away from the proximal suspender end 110*a* toward the handling implement 150 along a roll axis Yh of the handler 100, which is perpendicular to the pitch axis Xh and orientable at a pitch angle relative to the yaw axis Zh. When the suspender 110 is vertically oriented and the body 120 is horizontally oriented, the yaw axis Zh and the roll axis Yh are perpendicular to one another. The roll axis Yh and the yaw axis Zh may be said to define a vertical longitudinal center plane of the handler 100, in which lay the first and second ends 120*a*, 120*b* of the body 120. A left side 100L of the handler 100 (FIG. 2) and a right side 100R of the handler 100 (FIG. 3) are disposed on either side of the vertical longitudinal center plane. In some embodiments, a suspender length of the suspender 110 defined between the mounting interface 114 and the suspender pivot 112 is greater than a length of the distal positioning link 16*e* of the positioning device 10. Maximization of the suspender length relative to the length of the distal positioning link 16*e* may desirably reduce sideways tilting of the handler 100 under certain circumstances such as when a center of gravity of the workpiece W supported by the handling implement 150 does not align with a center plane of the handler 100 containing the roll axis Yh and perpendicular to the pitch axis Xh. Depending on the embodiment, either one or both of the mounting interface 114 and the positioning effector 12 may form a rotational joint allowing the handler 100 to pivot, or to swivel, about the yaw axis Zh. In alternative embodiments, the rotational joint is omitted, and yet the handler 100 can still rotate about the yaw axis Zh provided that the distal positioning link 16*e* has the ability to be torsioned. In yet other embodiments, the suspender 110 is considered a part of the positioning device 10, and may thus correspond to the distal positioning link 16*e*, whereas the proximal suspender end 110*a* may correspond to the positioning effector 12 to which the body 120 of the handler 100 is mounted.

Still referring to FIGS. 2 to 4, in this embodiment, the suspender 110 and the balancing mechanism 130 are arranged so as to support and interact with the body 120 via the left and right sides 100L, 100R of the handler 100. Hence, the suspender 110 of this embodiment may be described as a yoke, i.e., a two-pronged structure having first and second yoke members 116, 116' which are interconnected at the distal suspender end 110*b* and which are split from one another at the proximal suspender end 110*a* so as to extend to either side of the body 120. The suspender pivot 112 is thus formed of a first and a second pivot 112, 112' collocated about the pitch axis Xh on either side of the body 120 and respectively connected to the first and second yoke members 116, 116'. At the distal suspender end 110*b*, a transverse yoke member interconnects the first and second yoke members 116, and the mounting interface 114 is pivotally connected to the transverse yoke member. The suspender 110 also includes a deflector 118 provided in the form of an arcuate member located at the distal suspender end 110*b*. The deflector 118 has a shape suitable for shielding hydraulic and/or electric connections of the handler 100 from the workpiece W as the workpiece W is handled via the handling implement 150. The deflector 118 lies in a plane transverse to the yaw axis Zh and is pivotable with the mounting interface 114 about the yaw axis Zh. It should be noted that in other embodiments, the suspender 110 and the balancing mechanism 130 may interact otherwise with the body 120. For instance, the suspender 110 may connect to the body 120 unilaterally, i.e., on a sole one of the left 100L and right 100R sides of the handler 100, or may connect to the body 120 at a location proximate to the vertical longitudinal central plane of the handler 100.

Referring to FIG. 4, the balancing mechanism 130 is in this embodiment an actuated linkage that includes at least one actuator, at least one link and at least one joint. The at least one actuator includes in this case a balancing actuator 132 being a powered, linear actuator connected to a power source of the hydraulic type. The balancing actuator 132 includes a first actuator end 132*a* pivotally connected to the body 120 about an axis parallel to the pitch axis Xh. A second actuator end 132*b* of the balancing actuator 132 is slidingly connected to the first actuator end 132*a*. A lever 134 of the balancing mechanism 130 has a first lever end 134*a* pivotally connected to the second actuator end 132*b* about an axis parallel to the pitch axis Xh, and a second lever end 134*b* pivotally connected to the suspender pivot 112 about the pitch axis Xh. In this case, the balancing actuator 132 is a sole actuator of the balancing mechanism 130, disposed alongside a top body surface 122 of the body 120 and extending in a plane parallel to the pitch axis Xh. The balancing actuator 132 generally extends away from the first body end 120*a* and toward the second body end 120*b* as it extends from the first actuator end 132*a* to the second actuator end 132*b*. The first actuator end 132*a* is pivotally connected to the body 120 via a tab 122*a* projecting from the top body surface 122. The second actuator end 132*b* is pivotally connected to the lever 134 via the first lever end 134*a* being a tab projecting from a transverse lever portion 134*c* (see FIG. 3) of the lever 134. The transverse lever portion 134*c* extends away from the first lever end 134*a* to either side of the body 120. A pair of lateral lever portions 134*d*, 134*d'* (see FIG. 3) of the lever 134 extend from the transverse lever portion 134*c* to a corresponding one of the first and second suspender pivots 112, 112'. In other embodiments, the balancing mechanism 130 includes more than one actuator, for example a pair of actuators mounted to opposite lateral surfaces 124, 124' (FIG. 3) of the body 120. In such embodiments, the lever 134 may be formed of two distinct levers connecting one of the actuators to a corresponding one of the first and second suspender pivots 112, 112'.

The balancing mechanism 130 also includes at least one translational joint to which the suspender pivot 112 is slidably mounted. In this embodiment, the at least one translational joint is provided in the form of a first track 136 and a second track 136' (FIG. 3) located on either side of the body 120 and extending longitudinally between the first and second body ends 120*a*, 120*b*. Each track 136, 136' has a first track end 136*a* and a second track end 136*b* spaced from one another, and extends from the first track end 1326 toward the second track end 136*b* as it extends away from the first body end 120*a* toward the second body end 120*b*. The first and the second suspender pivot 112, 112' are respectively slidably mounted to the first and the second track 136, 136'. In this embodiment, the first actuator end 132*a* is located closer to the second body end 120*b* than to the first body end 120*a*, and the tracks 136, 136' are located forward of the first actuator end 132*a*.

Figure 5:
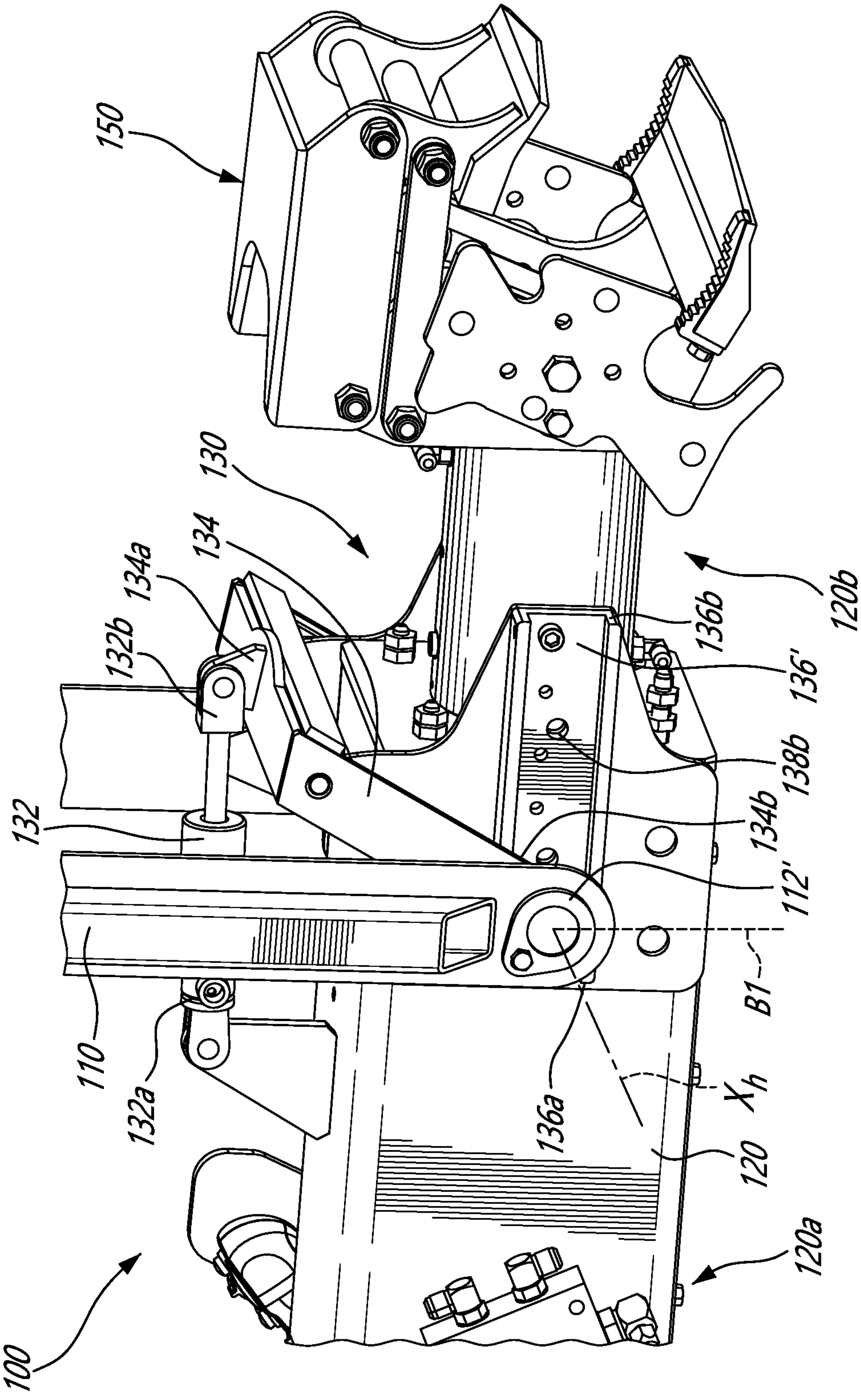
FIG. 5 is an enlarged view of a balancing mechanism of the powered handler of FIG. 2, with the balancing mechanism shown in a first balancing position.
Figure 6:
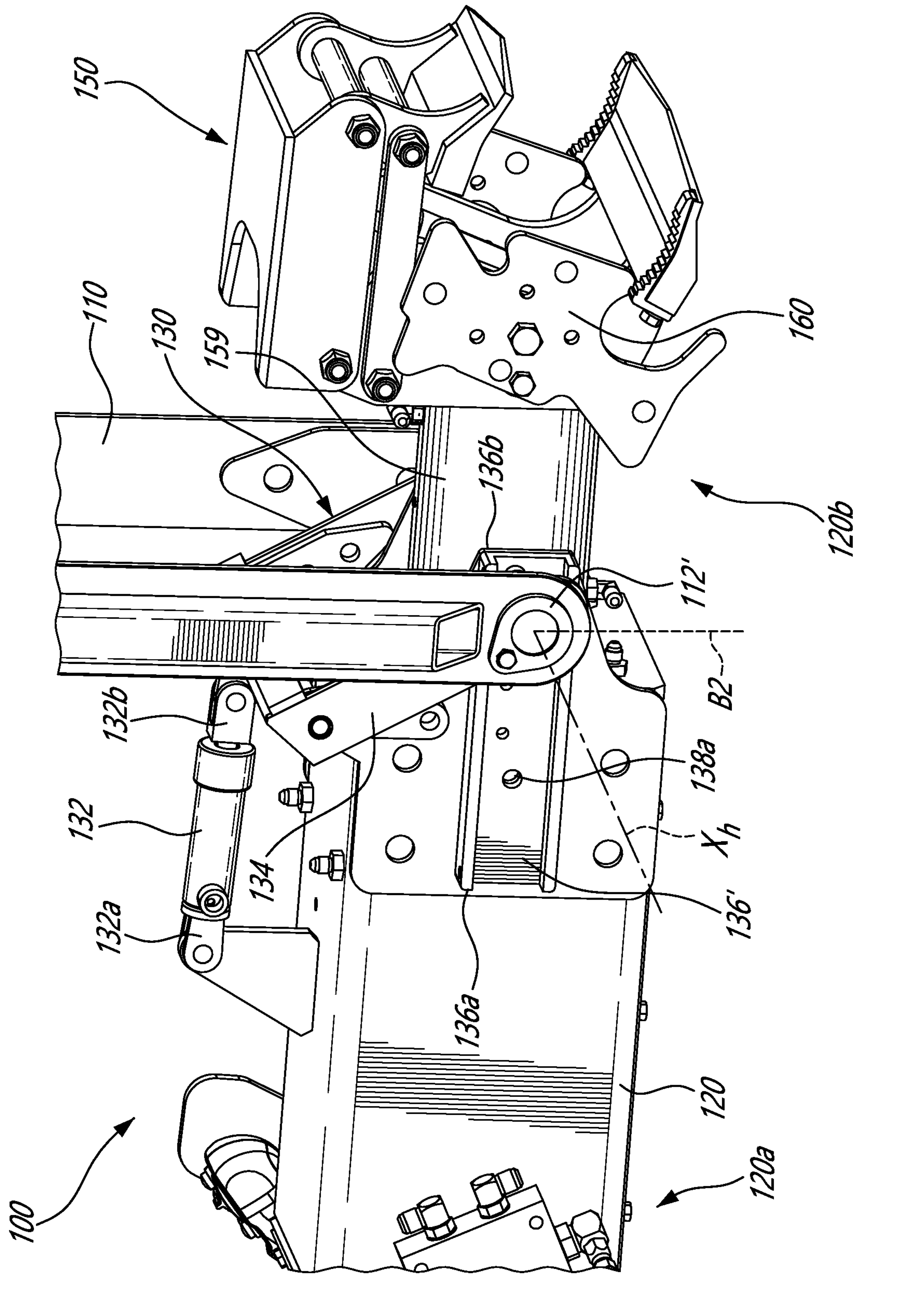
FIG. 6 is a close-up view of the balancing mechanism of FIG. 5, with the balancing mechanism shown in a second balancing position.

Characteristics of the kinematics of the balancing mechanism 130 will now be described with reference to FIGS. 4 to 6. The balancing actuator 132 has a working length defined between the first actuator end 132*a* and the second actuator end 132*b* that is variable between a withdrawn length and a deployed length greater than the withdrawn length. The balancing actuator 132, the lever 134 and the tracks 136, 136' are structured and arranged relative to one another such that a position of the suspender pivot 112 relative to the body 120 of the handler 100 varies from a first balancing position B1 (see FIGS. 4 and 5) to a second balancing position B2 (see FIG. 6) of the range of balancing positions B (FIG. 4) as the working length of the balancing actuator 132 varies from the deployed length to the withdrawn length, and vice versa. The first and the second balancing positions B1, B2 define opposite ends of the range of balancing positions B at which the balancing mechanism 130 can position the suspender pivot 112 upon the balancing actuator 132 having a corresponding working length between the withdrawn and deployed lengths. The suspender pivot 112 is closer to the second body end 120*b* (and hence to the handling implement 150) in the second balancing position B2 than in the first balancing position B1. Conversely, the suspender pivot 112 is closer to the first body end 120*a* in the first balancing position B1 than in the second balancing position B2.

Upon the balancing actuator 132 having the deployed length (FIG. 5), the suspender pivot 112 (and hence the first and second pivots 112, 112' and the pitch axis Xh) are at the first balancing position B1. The second actuator end 132*b* is forward of the suspender 110, i.e., is located between the suspender 110 and the second body end 120*b*. The lever 134 is at a forward angle relative to the suspender 110. In the first balancing position B1, the suspender pivot 112 is proximate to the first track end 136*a*, albeit at a distance therefrom. Upon the balancing actuator 132 having the withdrawn length (FIG. 6), the suspender pivot 112 (and hence the first and second pivots 112, 112' and the pitch axis Xh) are at the second balancing position B2. The second actuator end 132*b* is rearward of the suspender 110, i.e., is located between the suspender 110 and the first body end 120*a*. The lever 134 is at a rearward angle relative to the suspender 110. In the second balancing position B2, the suspender pivot 112 is proximate to the second track end 136*b*, albeit at a distance therefrom.

The handler 100 may include a stopper S (FIG. 4) for setting a desired range of displacement of the suspender pivot 112 relative to the body 120. In some embodiments, the stopper S is intrinsic to the balancing actuator 132, i.e., the balancing actuator 132 is operable to maintain a given working length so as to stop the suspender pivot 112 at a corresponding position of the range of balancing positions B. For example, the balancing actuator 132 may be arranged so as to maintain the deployed length in the presence of a hydraulic load equal to or greater than a first rated load and to maintain the withdrawn length in the presence of a hydraulic load equal to or less than a second rated load lower than the first rated load. In some such embodiments, the balancing actuator 132 is arranged so as to maintain a partially-deployed length smaller than the deployed length and greater than the withdrawn length in the presence of a hydraulic load corresponding to a third rated load between the first and the second rated loads.

In some embodiments, the stopper S (FIG. 4) is extrinsic to the balancing actuator 132, i.e., the stopper is a device that is mountable with respect to the balancing mechanism 130 to hinder a displacement of either the second actuator end 132*b*, the lever 134 or the suspender pivot 112 as the suspender pivot 112 is being displaced toward the first balancing position B1 or toward the second balancing position B2. For example, in at least one embodiment, at least one stopper S can be mounted to either one or both of the tracks 136, 136' so as to set a range of displacement of the suspender pivot 112. The set range of displacement can be either the full range of balancing positions B, for example upon a pair of stoppers S being mounted at either ends 136*a*, 136*b* of the tracks 136, 136'. The set range of balancing positions B can otherwise be a shortened range, for example rearwardly shortened upon a stopper being mounted to either one or both of the tracks 136, 136' between the corresponding first track end 136*a* and the suspender pivot 112, or forwardly shortened upon a stopper being mounted to either track 136, 136' between the suspender pivot 112 and the corresponding second track end 136*b*. Either one or both of the tracks 136, 136' may define one or more suitably located stopper mounting interface(s) via which the stopper S is removably mountable. For example, the stopper S may be provided in the form of a fastener such as a socket head screw, and the stopper mounting interface(s) may be threaded hole(s) located for example at a bottom of the corresponding track 136, 136' and sized for receiving a threaded length of the stopper S such that a head of the stopper S projects outwardly of the stopper mounting interface and into the corresponding track 136, 136'. Other implementations of the stopper S are contemplated, including but not limited to the stopper mounting interface being a recess defined by either one or both opposite lateral walls of the corresponding track 136, 136', and the stopper S being a member having a shape complementary to that of the recess, and being receivable by the recess so as to extend within the corresponding track 136, 136'. For example, the tracks 136, 136' in this case respectively define a rearwardmost stopper mounting interface 138*a* (FIG. 6) and a forwardmost stopper mounting interface 138*b* (FIG. 5). The rearwardmost and forwardmost stopper mounting interfaces 138*a*, 138*b* are holes in the tracks 136, 136' which are configured to receive therein the stopper S provided in the form of a fastener. Upon the stopper S being received by one such stopper mounting interface 138*a*, 138*b* of a given track 136, 136', the stopper S traverses the given track 136, 136' to locally restrict movement of the suspender pivot 112 relative to the given track 136, 136'. It should be noted that as the stopper S stops the suspender pivot 112 at a given position of the range of balancing positions B, the balancing mechanism 130 and the stopper S may form a rigid assembly suitable for maintaining the suspender pivot 112 in the given position regardless of the orientation of the handler 100 about the pitch axis Xh. For instance, when the stopper S is located between the suspender pivot 112 and the second track end 136*b* and engages the suspender pivot 112, the balancing actuator 132 may be held in position so as to oppose any movement of the suspender pivot 112 away from the stopper S and toward the first track end 136*a*.

The aforementioned is merely one of various suitable arrangements for the balancing mechanism 130. In some embodiments, the at least one translational joint of the balancing mechanism 130 is provided in the form of at least one rack and pinion mechanism, whose rack is affixed to the body 120 and whose pinion is affixed to the suspender pivot 112. In some embodiments, the balancing mechanism 130 is electrically powered, i.e., the at least one balancing actuator is connected to an electrical power source. In some embodiments, the at least one balancing actuator includes a manual actuation means such as a hand lever or a handle that may be moved by the user U so as to displace the suspender pivot 112. In some such embodiments, the manual actuation means is coupled to another actuator being of the electrically or hydraulically-powered type.

In embodiments, the balancing mechanism 130 is arranged such that the range of balancing positions B is inclusive of an unloaded balanced position and at least one loaded balanced position. The unloaded balanced position corresponds to a position at which the suspender pivot 112 is collocated with an unloaded center of gravity $CG_U$ (FIG. 4) of the handler 100, i.e., a center of gravity of the handler 100 defined by the suspended portion of the handler 100 (i.e., the body 120, the balancing mechanism 130, the input device 140 and the handling implement 150), while the handler 100 is free of onboard load. The at least one loaded balanced position corresponds to a position at which the suspender pivot 112 is collocated with a loaded center of gravity $CG_L$ (FIG. 1) of the handler 100, i.e., a center of gravity of the handler 100 defined by the suspended portion of the handler 100 together with the workpiece W while the workpiece W is supported by the handling implement 150. When the workpiece W is supported by the handling implement 150, whether fully or partially, an onboard load L (FIG. 1) is borne by the handler 100. The onboard load L corresponds to an onboard weight of the workpiece W as it is supported by the handler 100 via the handling implement 150, and hence at a location proximate to the second body end **120*b*. By way of this arrangement of the balancing mechanism 130, the suspended portion of the handler 100 is balanced with respect to the pitch axis Xh upon being in the unloaded balanced position absent any onboard load, and upon being in the at least one loaded balanced position in presence of the corresponding onboard load L. In either case, such balancing of the suspended portion of the handler 100 can desirably allow the user U to precisely and effortlessly hold the suspended portion in any given orientation about the pitch axis Xh and, conversely, mitigate the risk of a sudden tip over about the pitch axis Xh. Also, in either case, the input device 140** remains at a distance from the pitch axis Xh, which can desirably assist the user U to pivot the suspended portion about the pitch axis Xh with lessened opposition from the inertia of the suspended portion.

In some embodiments, the at least one loaded balanced position includes a maximum loaded balanced position, and also includes a minimum loaded balanced position located between the unloaded balanced position and the maximum loaded balanced position. The maximum and minimum loaded balanced positions correspond to positions at which the suspender pivot 112 is collocated with the center of gravity of the handler 100 inclusive of respectively a maximum load and a minimum load of a range of onboard loads. This range of onboard loads may correspond to a range of workpieces W having different weights due to differences in materials and/or dimensions. For instance, as will become apparent from the forthcoming, the handling implement 150 may in some cases be adapted to handle workpieces W in the form of drill rods having different diameters. In some embodiments, the unloaded balanced position corresponds to the first balancing position B1, and the maximum loaded balanced position corresponds to the second balancing position B2.

Referring to FIGS. 7 to 11, the handling implement 150 includes a clamp 152 located at the second body end **120*b*. The clamp 152 has opposed jaws 152*a*, 152*b* and a handling mechanism 154 that is operatively connected between the body 120 and the clamp 152 to displace at least one of the jaws relative to the second body end 120*b* between a first clamp position and a second clamp position. In the depicted embodiment, the jaws include a first jaw 152*a* and a second jaw 152*b* spaced from one another so as to define a variable working volume V (FIGS. 8-10) of the clamp 152. An open side of the working volume V extending between the jaws 152*a*, 152*b* may be referred to as a clamp opening O. Each one of the jaws 152*a*, 152*b* defines a closed side of the working volume V as it extends laterally, or widthwise, from an upright center plane 152*c* of the clamp 152 that divides the clamp 152 into two generally symmetrical portions. In other embodiments, either one or both of the jaws 152*a*, 152*b* may be asymmetrical. The second jaw 152*b* is wider than the first jaw 152*a*, although the jaws 152*a*, 152*b* may be sized otherwise. In the first clamp position (FIG. 8), at the clamp opening O, the jaws 152*a*, 152*b* define a first jaw distance D1 being greater than a cross-sectional dimension of a first workpiece W1, for example a diameter thereof in the case of a drill rod. In the second clamp position (FIG. 9), at the clamp opening O, the jaws 152*a*, 152*b* define a second jaw distance D2 that is smaller than the first jaw distance D1. The second jaw distance D2 may for example correspond to a distance at which the jaws 152*a*, 152*b* simultaneously conform to a cross-sectional shape of the first workpiece W1. The first and the second clamp positions may in some cases be referred to as an open clamp position and a first closed clamp position, respectively corresponding to a position in which the clamp 152 is suitably arranged for removably receiving the first workpiece W1 in its working volume, and to a position in which the clamp 152 is suitably arranged for securely holding the first workpiece W1** in its working volume.

Figure 7:
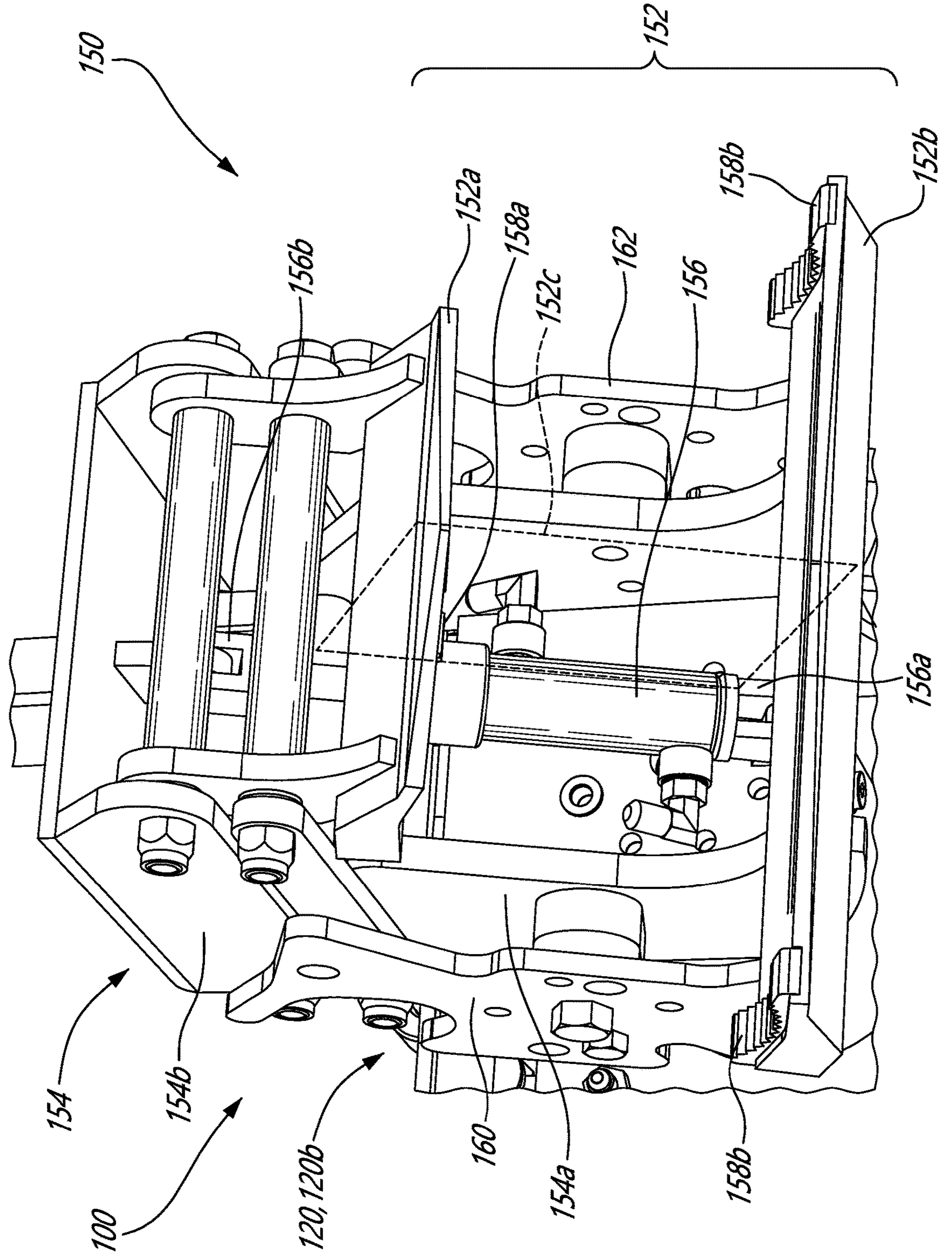
FIG. 7 is a close-up view of a handling implement of the powered handler of FIG. 2.

As best seen in FIG. 7, the handling mechanism 154 includes a frame **154*a* interconnecting the first jaw 152*a* and the second jaw 152*b*. The second jaw 152*b* is fixedly connected to the frame 154*a*, whereas the first jaw 152*a* is movably connected to the frame 154*a* via a parallel linkage 154*b* of the handling mechanism 154. The frame 154*a* and the parallel linkage 154*b* may be said to be portions of a handling linkage of the handling mechanism 154. In this embodiment, the frame 154*a* is a rigid structure. In other embodiments, the frame 154*a* may include movably connected members. A handling actuator 156 of the handling mechanism 154 has a first handling actuator end 156*a* pivotally connected to the frame 154*a* and a second handling actuator end 156*b* pivotally connected to the parallel linkage 154*b*. The handling actuator 156 has a working length defined between the first handling actuator end 156*a* and the second handling actuator end 156*b* that is variable between a withdrawn length and a deployed length greater than the withdrawn length. The handling actuator 156 is operable to vary the working length thereof such that the jaws 152*a*, 152*b* move across a range of jaw positions inclusive of the first and second jaw positions as the working length varies from the withdrawn length to the deployed length. In some embodiments, the jaws 152*a*, 152*b* are in the first clamp position upon the handling actuator 156 having the deployed length, and in the second clamp position upon the handling actuator 156 having the withdrawn length. In the depicted embodiment, upon the handling actuator 156 having the withdrawn length, the jaws 152*a*, 152*b* are in a position of the range of jaw positions in which, at the clamp opening O, the jaws 152*a*, 152*b* define a jaw distance that is smaller than the second jaw distance D2, for example a third jaw distance D3 (FIG. 10**).

Figure 8:
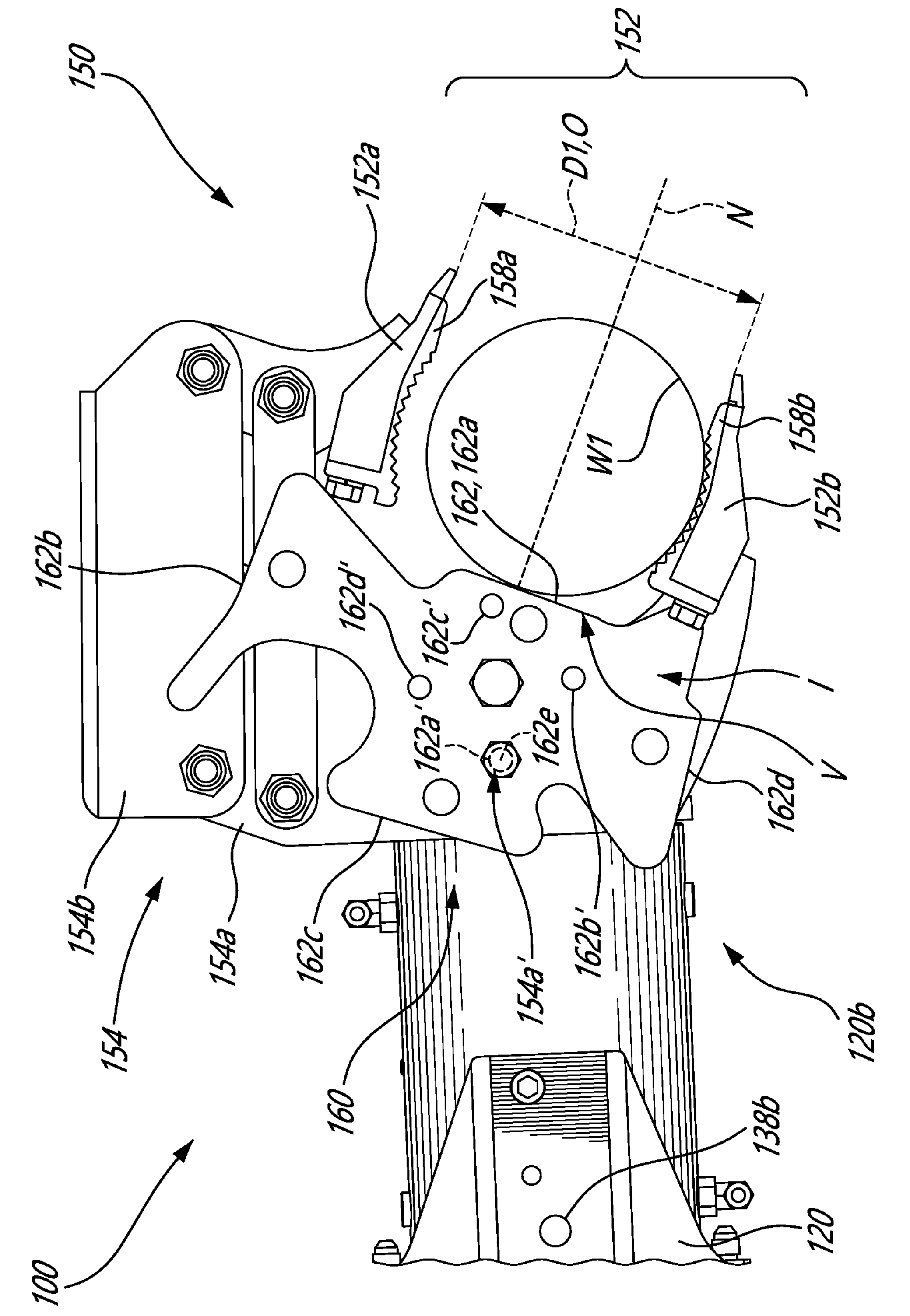
FIG. 8 is a close-up view of a clamp of the handling implement of FIG. 7, with the clamp shown in an open clamp position.
Figure 8:
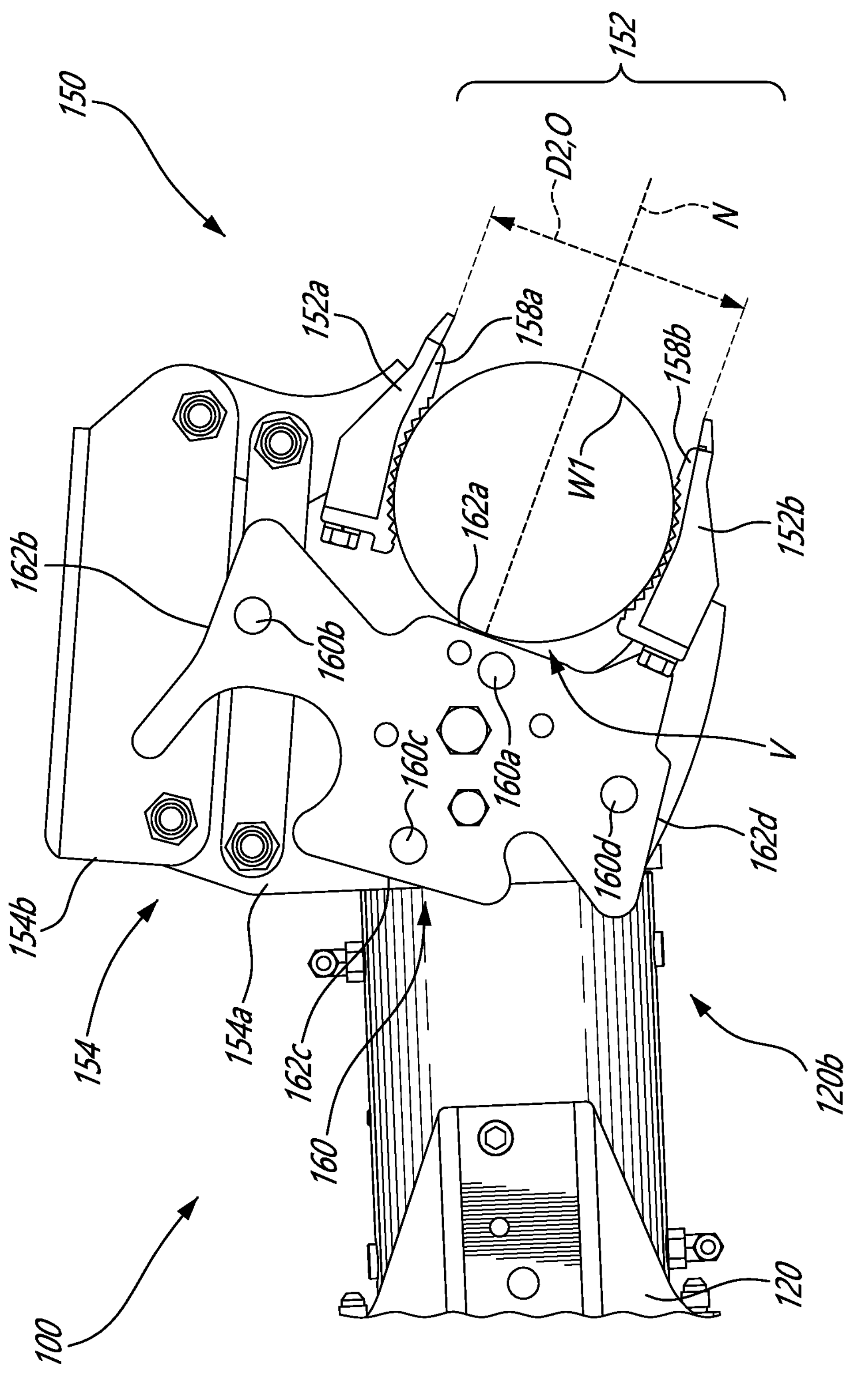

Referring to FIGS. 8 to 9, in some embodiments, the first and the second jaw **152*a*, 152*b* respectively have at least one workpiece grip, henceforth referred to as first workpiece grips 158*a*, 158*b*, shaped and arranged such that upon the clamp 152 being in the second clamp position, the first workpiece grips 158***a*, 158*b* simultaneously conform to the cross-sectional shape of the first workpiece W1. In the depicted embodiment, the first jaw 152*a* has one first workpiece grip 158*a* that is disposed centrally, i.e., at the upright center plane 152*c* of the clamp 152. The second jaw 152*b* has a pair of first workpiece grips 158*b* that are spaced from one another on either side of the upright center plane 152*c* of the clamp 152 (see FIG. 7). The aforementioned is merely an exemplary one of various suitable arrangements of the first workpiece grips 158*a*, 158*b*. Each one of the first workpiece grips 158*a*, 158*b* has an arcuate portion having a curvature corresponding to that of the first workpiece W1. Upon the clamp 152 being in the second clamp position, the arcuate portions both conform to a notional circle having the diameter of the first workpiece W1. Also, it should be noted that the second jaw distance D2 is smaller than the diameter of the workpiece W, such that the clamp 152 may be said to form a constriction at the clamp opening O upon the clamp 152 being in the second clamp position. In other embodiments, the constriction may be omitted. In this embodiment, the first workpiece grips 158*a*, 158*b* are removably mounted to a remainder of the jaws 152*a*, 152*b*, in this case via fasteners, so as to facilitate replacement, for example to install replacement workpiece grips that are unworn or that may be more suitable for a given task. As an example, in embodiments, the first workpiece grips 158*a*, 158*b* are a first subset of a set of workpiece grips of various sizes, and are interchangeable with suitably sized grips of another subset depending on the size of the workpiece W that the user U intends to handle with the handler 100.

Figure 10:
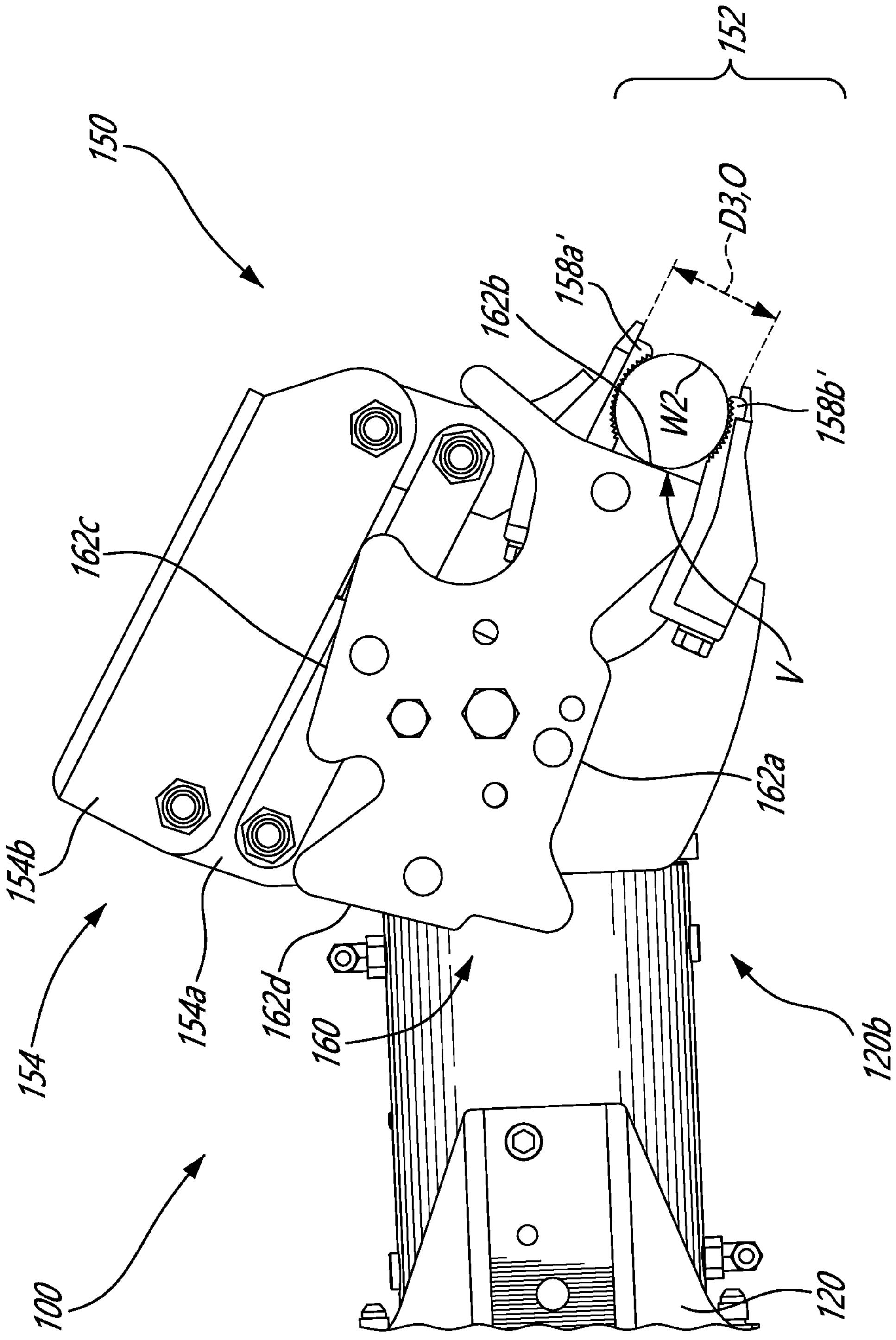
FIG. 10 is a close-up view of the clamp of FIG. 8, with the clamp shown in a second closed clamp position.

In FIG. 10, the clamp 152 is shown in a third clamp position in which, at the clamp opening O, the jaws 152*a*, 152*b* define the third jaw distance D3, in this case a distance that is smaller than the second jaw distance D2 and in which the handling actuator 156 has the withdrawn length. The third jaw distance D3 may for example correspond to a distance at which the jaws 152*a*, 152*b* simultaneously conform to a cross-sectional shape of a second workpiece W2 of a size smaller than the first workpiece W1. Hence, whereas the second clamp position may be referred to as the first closed clamp position, the third clamp position may be referred to as a second closed clamp position. The first workpiece grips 158*a*, 158*b* have been removed from the first and the second jaw 152*a*, 152*b* and replaced with second workpiece grips 158*a*', 158*b*' of a second subset of the set of workpiece grips. The second workpiece grips 158*a*', 158*b*' are shaped and arranged such that upon the clamp 152 being in the third clamp position, the second workpiece grips 158*a*', 158*b*' simultaneously conform to the cross-sectional shape of the second workpiece W2. In the depicted embodiment, each one of the second workpiece grips 158*a*', 158*b*' has an arcuate portion having a curvature corresponding to that of the second workpiece W2. Upon the clamp 152 being in the third clamp position, the arcuate portions of the second workpiece grips 158*a*', 158*b*' both conform to a notional circle having the diameter of the second workpiece W2.

As shown in FIGS. 8 and 9, the handling mechanism 154 is arranged such that as the jaws 152*a*, 152*b* move to and from any position of the range of jaw positions, the jaws 152*a*, 152*b* maintain a constant orientation with respect to one another. The clamp opening O may be said to extend perpendicularly to a notional plane N, and the jaws 152*a*, 152*b* respectively maintain a same angle relative to the notional plane N across a range of clamp positions. As such, the clamp 152 may be said to have vise-like kinematics. Such kinematics may be desirable to impart a suitably oriented clamping load via the jaws 152*a*, 152*b* to any one of the workpieces W1, W2 regardless of its size.

Still referring to FIGS. 7 and 8, the handling implement 150 also includes an abutment 160 arranged relative to the jaws 152*a*, 152*b* to extend therebetween so as to delimit a side of the working volume V opposite the clamp opening O. The abutment 160 may be said to be cooperable with at least one of the jaws 152*a*, 152*b* to size the working volume V relative to a given workpiece W. The abutment 160 is joined to the frame 154*a* so as to be selectively positionable relative thereto in any one of a plurality of abutment positions. The abutment 160 is a plate-like structure having a periphery 162 defining a plurality of abutment surfaces 162*a*, 162*b*, 162*c*, 162*d*. The abutment 160 is pivotally connected to the frame 154*a* to be pivotable into any one of the plurality of abutment positions such that a corresponding one of the plurality of abutment surfaces 162*a*, 162*b*, 162*c*, 162*d* faces toward the clamp opening O. The handling implement 150 includes an indexing means I (FIG. 8) for securely indexing the abutment 160 in either one of the abutment positions relative to the frame 154*a*. In this embodiment, the indexing means I includes a pin 162*e*, a frame hole 154*a*' defined by the frame 154*a*, and a plurality of abutment holes 162*a*', 162*b*', 162*c*', 162*d*' defined by each abutment 160 (FIG. 8) and respectively corresponding to one of the abutment surfaces 162*a*, 162*b*, 162*c*, 162*d*. Upon the abutment 160 being in a given position of the plurality of abutment positions, a corresponding hole of the abutment holes 162*a*', 162*b*', 162*c*', 162*d*' is concentrically aligned with the frame hole 154*a*', such that the pin 162*e* may be installed so as to extend from inside the corresponding hole to inside the frame hole 154*a*', thereby securing the abutment 160 in the given position relative to the frame 154. A first abutment position of the plurality of abutment positions is shown in FIGS. 8 and 9. In the first abutment position, a first abutment surface 162*a* of the plurality of abutment surfaces 162*a*, 162*b*, 162*c*, 162*d* faces toward the clamp opening O at a first abutment distance therefrom. The first abutment surface 162*a* is shaped and arranged such that upon the abutment 160 being in the first abutment position and the second jaw 152*b* being provided with the corresponding first workpiece grip 158*b*, the first abutment surface 162*a* and the first workpiece grip 158*b* simultaneously conform to the cross-sectional shape of the first workpiece W1. In FIG. 10, the abutment 160 is positioned in a second abutment position of the plurality of abutment positions, in which a second abutment surface 162*b* of the plurality of abutment surfaces 162*a*, 162*b*, 162*c*, 162*d* faces toward the clamp opening O at a second abutment distance therefrom. The second abutment distance is smaller than the first abutment distance. The second abutment surface 162*b* is shaped and arranged such that upon the abutment 160 being in the second abutment position and the second jaw 152*b* being provided with the corresponding second workpiece grip 158*b*', the second abutment surface 162*b* and the second workpiece grip 158*b*' simultaneously conform to the cross-sectional shape of the second workpiece W2. Any given one of the abutment surfaces 162*a*, 162*b*, 162*c*, 162*d* is shaped and arranged with regard to a corresponding workpiece grip of the set of workpiece grips and to a corresponding cross-sectional shape of a corresponding workpiece W, such that upon the abutment 160 being in a corresponding abutment position and the second jaw 152*b* being provided with the corresponding workpiece grip, any given one of the abutment surfaces 162*a*, 162*b*, 162*c*, 162*d* and the corresponding workpiece grip simultaneously conform to the corresponding cross-sectional shape of the workpiece W. The workpiece grips may be constructed of polymeric materials, metallic materials and/or composite materials having mechanical properties suitable for handling the workpiece W. In some embodiments, the workpiece grips may be magnetic, whether fully or in part. Also, in the depicted embodiment, the abutments 160 bear visual indicators 160*a*, 160*b*, 160*c*, 160*d* (FIG. 9) respectively located nearby a corresponding one of the abutment surfaces 162*a*, 162*b*, 162*c*, 162*d*. Each visual indicator 160*a*, 160*b*, 160*c*, 160*d* allows to visually associate its corresponding abutment surface 162*a*, 162*b*, 162*c*, 162*d* to a subset of suitably sized workpiece grips among the set of workpiece grips. Here, the visual indicators 160*a*, 160*b*, 160*c*, 160*d* each have a color matching that of the workpiece grips of a specific subset.

It should be noted that the plurality of abutment surfaces 162*a*, 162*b*, 162*c*, 162*d* also includes a third abutment surface 162*c* and a fourth abutment surface 162*d* respectively oriented toward the clamp opening O when the abutment 160 is in a third and a fourth abutment position of the plurality of abutment positions. The set of workpiece grips also includes third and fourth workpiece grips. The clamp 152 is also displaceable into third and fourth closed clamp positions of the range of jaw positions. The third workpiece grips are shaped and arranged such that upon the third workpiece grips being fastened to the jaws 152*a*, 152*b* and the clamp 152 being in the third closed clamp position, the third workpiece grips simultaneously conform to a cross-sectional shape of a third workpiece W. Conversely, the fourth workpiece grips are shaped and arranged such that upon the fourth workpiece grips being fastened to the jaws 152*a*, 152*b* and the clamp 152 being in the fourth closed clamp position, the fourth workpiece grips simultaneously conform to a cross-sectional shape of a fourth workpiece W. In this embodiment, the handling implement 150 includes a pair of abutments 160 disposed on either side of the upright center plane 152*c* of the clamp 152.

Figure 11:
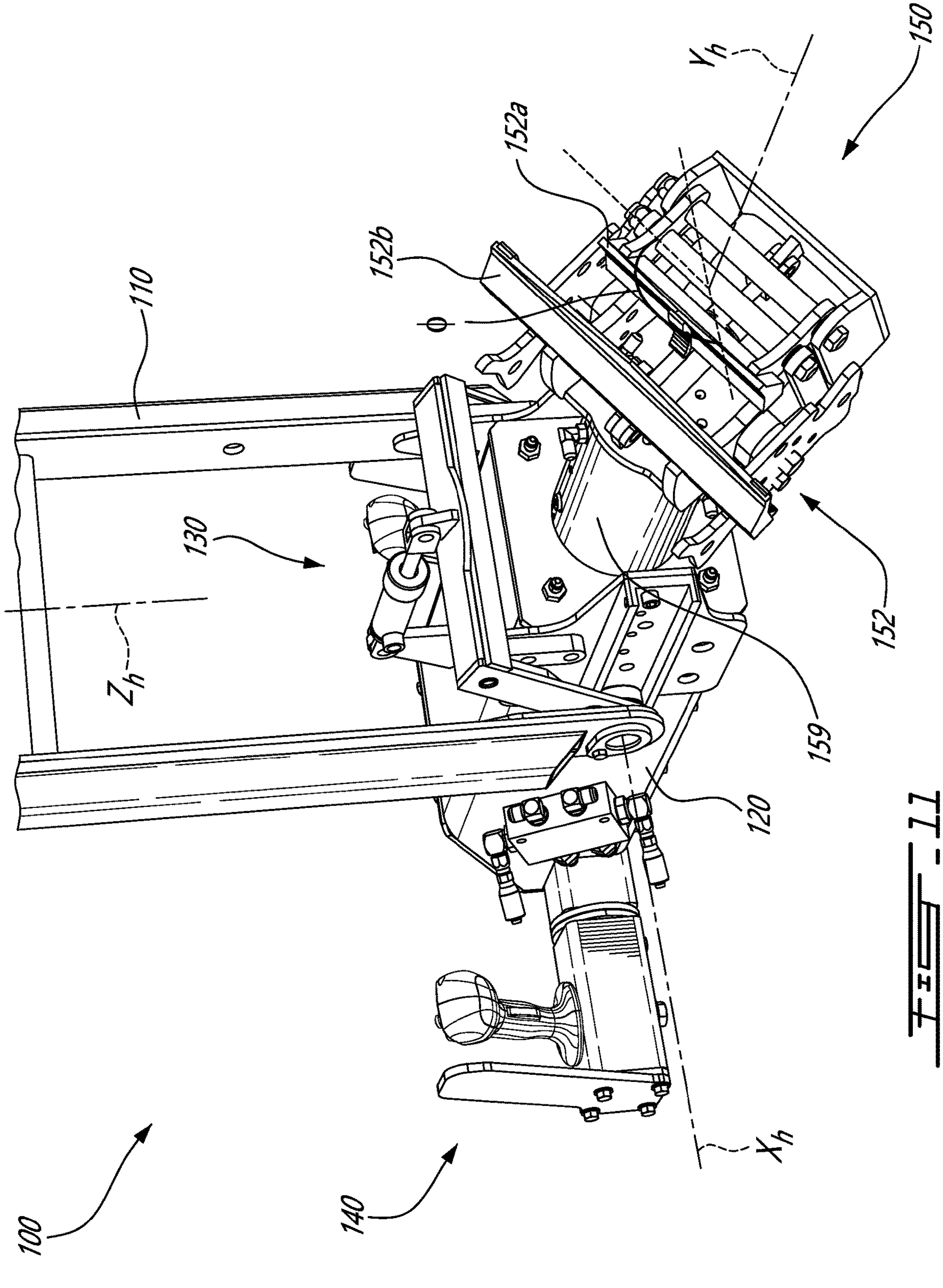
FIG. 11 is a perspective view of the powered handler of FIG. 2, with the handling implement of FIG. 7 shown at a roll angle.

In FIG. 11, the handling implement 150 is shown rotated with respect to the body 120 about the roll axis Yh. The handler 100 includes a rotary actuator 159 that is operatively connected between the body 120 and the handling implement 150 to rotate the handling implement 150 about the roll axis Yh. In certain embodiments, rotation about the roll axis Yh may be limited to a roll angle $\phi$ of between 0 and 180 degrees either clockwise or counterclockwise. In some embodiments, the handling implement 150 may be mounted relative to the body 120 such that the handling implement 150 is controllably displaceable relative to the body 120 and relative to the pitch axis Xh along the roll axis Yh via a suitable displacement actuator. In such embodiments, the structural relationship between the body 120 and the handling actuator 150 may be described as telescopic or "boom-like". The displacement actuator may be said to form part of the balancing mechanism 130. Indeed, the displacement actuator may be operated to extend or withdraw the handling implement 150 relative to the body 120 so as to position the handling implement 150 relative to the pitch axis Xh as needed to collocate the center of gravity of the handler 100 with the pitch axis Xh. In some such embodiments, the rotary actuator 159 may be of the roto-linear type, and hence be suitable for imparting independent rotary and/or linear motions to the handling implement 150.

The clamp 152 is merely one of many load-supporting features that the handling implement 150 may be provided with and by way of which the workpiece W may be directly or indirectly supported. A non-comprehensive list of such load-supporting features is also inclusive of, albeit not limited to, an electro-magnet, a hook, an anchoring loop and a fork. In some embodiments, the clamp 152 is provided in combination with another one or more of such load-supporting features. In other embodiments, the clamp 152 is omitted, and at least another one of such load-supporting features of the handling implement 150 is used to seize and manipulate the workpiece W.

Figure 12:
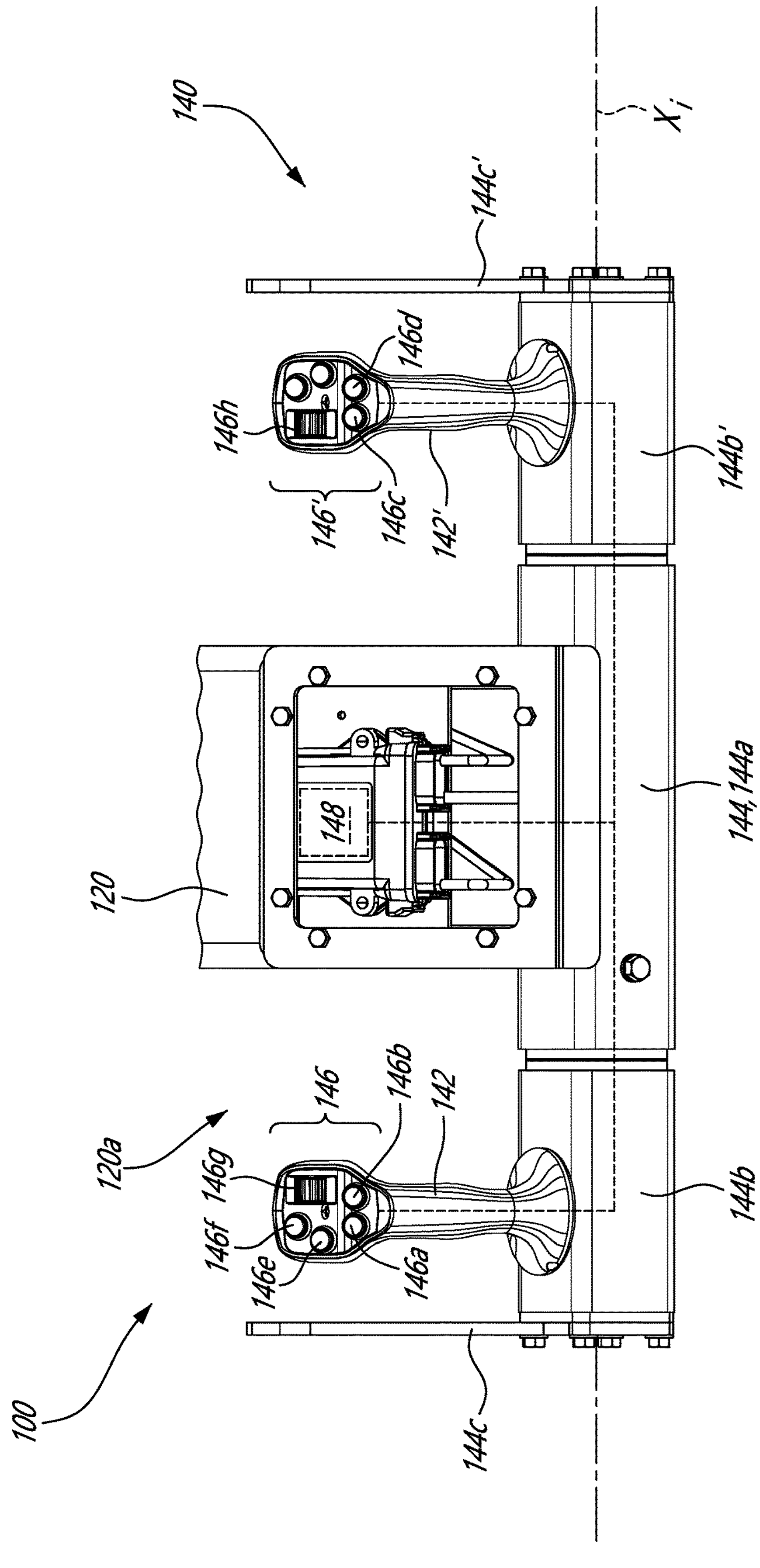
FIG. 12 is a perspective view of an input device of the powered handler of FIG. 2.

Turning now to FIG. 12, the input device 140 and operational characteristics of the handling system 1 will now be described in greater detail. The input device 140 generally includes a holding means via which the user U (FIG. 1) can interact with the handler 100 to impart a pivoting motion to the body 120 relative to the suspender 110 about the pitch axis Xh and/or a pivoting motion to the handler 100 relative to the positioning device 10 about the yaw axis Zh. The holding means is in this case provided in the form of a pair of joystick-like first and second handles 142, 142' disposed on either side of the body 120 at the first body end 120*a*.

In the present embodiment, the input device 140 also includes a transverse member 144 extending to either side of the body 120 along an axis Xi of the input device 140 that is parallel to the pitch axis Xh. A proximal portion 144*a* of the transverse member 144 is fixedly joined to the first body end 120*a*, whereas distal portions 144*b*, 144*b'* disposed on either side of the proximal portion 144*a* are pivotable relative to the proximal portion 144*a* about the axis Xi. The handles 142, 142' respectively project from one of the distal portions 144*b*, 144*b'* and are thus pivotable therewith about the axis Xi. This arrangement of the handles 142, 142' relative to the body 120 allows the user U to maintain the handles 142, 142' in a given orientation as the input device 140 is raised or lowered to impart the pivoting motion to the body 120 relative to the suspender 110 about the pitch axis Xh. Handguards 144*c*, 144*c'* also project from the distal portions 144*b*, 144*b'* alongside the handles 142, 142'.

Referring to FIG. 12, the input device 140 has a plurality of controls 146, 146' configured for operating the handling system 1, in this case located on the handles 142, 142', namely a first set of controls 146 located on the first handle 142 and a second set of controls 146' located on the second handle 142'. In this embodiment, the handling implement 150 is of a type that is selectively operable via the input device 140. A handler controller 148 of the handler 100 is operatively connected between some of the controls 146, 146' and the handling actuator 156 such that the handling implement 150 is operable via such controls, namely a first button 146*a* configured for opening the clamp 152 (i.e., for causing the handling actuator 156 to move toward the deployed position), and a second button 146*b* configured for closing the clamp 152 (i.e., for causing the handling actuator 156 to move toward the withdrawn position). In some embodiments, some of the controls 146, 146' are configured for causing the clamp 152 to move to a desired discrete position, for example the open clamp position (FIG. 8) and/or a given closed clamp position such as the first closed clamp position (FIG. 9) or the second closed clamp position (FIG. 10). In this embodiment, the handling actuator 156 is of the hydraulic type, and the handler controller 148 includes a switch electrically connected to a valve that is fluidly connected between a fluid source and the handling actuator 156. Hence the handler controller 148 is adapted for controlling a hydraulic flow to the handling actuator 156. The handler controller 148 is also operatively connected between the controls 146, 146' and the rotary actuator 159. A third button 146*c* and a fourth button 146*d* of the controls 146, 146' are configured for causing the handling implement 150 to rotate about the roll axis Yh clockwise and counterclockwise, respectively. In some embodiments, some of the controls 146, 146' are configured for causing the handling implement 150 to rotate to a desired discrete roll angle. In some embodiments, the controls 146, 146' are configured such that simultaneous actuation of at least one button from each of the first and second sets of controls 146, 146' is required for certain operations of the system 1, for example to open the clamp 152.

In embodiments, the positioning device 10 is selectively operable via the input device 140 to displace the positioning effector 12 with the handler 100 within the work environment E. A positioning controller of the positioning device 10 is operatively connected between some of the controls 146, 146' of the input device 140 and at least one actuation means of the positioning device 10 such that the positioning effector 12 is selectively positionable within the work environment E via such controls. In this embodiment, the input device 140 is wirelessly connected to the positioning controller. In other embodiments, the input device 140 may instead be wiredly connected to the positioning controller. A fifth button **146*e* and a sixth button 146*f* of the controls 146, 146' are configured for controlling rotation of the telescopic boom 16*b*, 16*c*, 16*d* about the horizontal positioning axis, or for otherwise causing the positioning effector 12 to move downwardly and upwardly, respectively. A first rocker switch 146*g* is configured for controlling rotation of the telescopic boom 16*b*, 16*c*, 16*d* with the column 16*a* about the vertical positioning axis, and a second rocker switch 146*h* is configured for controlling extension of the telescopic boom 16*b*, 16*c*, 16*d***.

In embodiments, the balancing mechanism 130 is automatically operated. The balancing mechanism 130 may thus be said to be auto-balancing. The handler controller 148 is operatively connected to the balancing actuator 132 such that the working length of the balancing actuator 132, and hence the position of the suspender pivot 112 within the range of balancing positions B (FIG. 4), is governed by the handler controller 148. In this embodiment, the balancing actuator 132 is of the hydraulic type, and the handler controller 148 includes a switch electrically connected to a valve that is fluidly connected between a fluid source and the balancing actuator 132. Hence, the handler controller 148 is adapted for controlling a hydraulic flow to the balancing actuator 132.

Moreover, the handler controller 148 in this case is configured for operating the balancing mechanism 130 as a function of the operation of the handling implement 150. The balancing actuator 132 may be said to be operatively coupled to the handling actuator 156. More specifically, the handler controller 148 is configured for causing the suspender pivot 112 to be in a given unloaded balanced position, for example the first balancing position B1 (FIGS. 4, 5), when the clamp 152 is in the open clamp position. For instance, upon the suspender pivot 112 being forward of the given unloaded balanced position and the clamp 152 having moved toward the open clamp position, the handler controller 148 sequentially causes the suspender pivot 112 to move into the given unloaded balanced position. Depending on the embodiment, the handler controller 148 may be configured to move the suspender pivot 112 toward the given unloaded balanced position either at the onset of the movement of the clamp 152 toward the open clamp position, during the movement, or after the movement. For example, pressing the first button **146*a* of the input device 140 (FIG. 12) may signal the handler controller 148 to cause the suspender pivot 112 to start moving toward the given unloaded balanced position and to cause the clamp 152 to start moving toward the open clamp position simultaneously. The handler controller 148 is also configured for causing the suspender pivot 112 to be in a given loaded balanced position, for example the second balanced position B2 (FIGS. 4, 6), when the clamp 152 is in a given closed clamp position, for example the first closed clamp position (FIG. 9). Upon the suspender pivot 112 being rearward of the given loaded balanced position and the clamp 152 having moved toward the given closed clamp position, the handler controller 148 sequentially causes the suspender pivot 112 to move into the given loaded balanced position. Depending on the embodiment, the handler controller 148 may be configured to move the suspender pivot 112 toward the given loaded balanced position either at the onset of the movement of the clamp 152 toward the given closed clamp position, during the movement, or after the movement. For example, pressing the second button 146*b* of the input device 140 (FIG. 12) may signal the handler controller 148 to cause the clamp 152 to start moving toward the given closed clamp position, and to cause the suspender pivot 112 to start moving toward the given loaded balanced position once a certain minimal hydraulic load has been supplied to the handling actuator 156 and/or once the handling actuator 156 has attained a certain working length. In this embodiment, the suspender pivot 112 moves toward the given loaded balanced position after the clamp 152 has reached the given closed clamp position. This configuration allows the clamp 152 to secure the workpiece W before the suspender pivot 112** moves.

Referring to the Figures and more particularly to FIG. 1, there is disclosed a method for handling a workpiece with a powered assistance (for example one or more of the positioning device 10, the balancing actuator 132, the handling actuator 156 and the rotary actuator 159), which may for example be implemented using the handling system 1 for handling the workpiece W. The method includes displacing the handling implement 150 (as well as a remainder of the suspended portion of the handler 100) with the powered assistance toward the workpiece W, with the handling implement 150 (as well as the remainder of the suspended portion of the handler 100) being balanced about at least the pitch axis Xh during displacement. Absent any onboard load, the handling implement 150 (as well as the remainder of the suspended portion of the handler 100) may also be balanced about one or both of the roll axis Yh and the yaw axis Zh during displacement. The workpiece W may for instance be initially located at the first workpiece position $P_{W1}$. In some embodiments, displacing the handling implement 150 toward the workpiece W includes displacing the handling implement 150 to the first workpiece position $P_{W1}$, such that the portion of the handling implement 150 engages the underside of the workpiece W while the weight of the workpiece W has yet to be supported by the handling implement 150. For example, the workpiece W may be supported above the ground in the first workpiece position $P_{W1}$ by a suitable supporting means such as a handling device, a storage rack or a worker, and the handling implement 150 (for example the second jaw **152*b***) of may merely contact the workpiece W without supporting its weight.

The method also includes displacing the handling implement 150 (as well as the remainder of the suspended portion of the handler 100) together with the workpiece W using the powered assistance, with the handling implement 150 (as well as the remainder of the suspended portion of the handler 100) and the workpiece W being balanced about at least the pitch axis Xh. Understandably, this may occur once the workpiece W is suitably supported by the handling implement 150, for example via clamping. In embodiments, the method includes clamping the workpiece with the handling implement 150 before displacing the handling implement 150 with the workpiece W. The clamping of the workpiece W may include, with the second jaw 152*b* of the clamp 152 engaging the underside of the workpiece W, moving the clamp from a first clamp position in which the first jaw 152*a* of the clamp 152 is spaced relative to the workpiece W to a second clamp position in which the first jaw 152*a* engages the workpiece W opposite from the second jaw 152*b*. In some such embodiments, the second clamp position is one of the first, second, third and fourth closed clamp positions. In some such embodiments, the first clamp position is the open clamp position, i.e. a clamp position at which the jaw distance is greater than that at the second clamp position. In some embodiments, clamping comprises exerting a clamping force onto the workpiece W via the handling implement 150.

In embodiments, the method includes displacing the pitch axis Xh of the suspender 110 toward the handling implement 150 before displacing the handling implement 150 (as well as the remainder of the suspended portion of the handler 100) with the workpiece W. For example, as the suspender pivot 112 defining the pitch axis Xh is displaced away from the first balancing position B1 and toward the second balancing position B2, the pitch axis Xh is displaced toward the handling implement 150. The clamping of the workpiece W may start upon or before displacing the pitch axis Xh toward the handling implement 150.

In embodiments, the method includes a step of displacing the handling implement 150 (as well as the remainder of the suspended portion of the handler 100) with the powered assistance away from the workpiece W, the handling implement 150 (as well as the remainder of the suspended portion of the handler 100) being balanced about at least the pitch axis Xh during displacement. Understandably, this may occur once the workpiece W is suitably removed from the handling implement 150. In embodiments, the method includes unclamping the workpiece W with the handling implement 150 before displacing the handling implement 150 (as well as the remainder of the suspended portion of the handler 100) away from the workpiece W. The unclamping of the workpiece W may include, with the second jaw 152*b* of the clamp 152 engaging the underside of the workpiece W, moving the clamp 152 from the second clamp position to the first clamp position.

In embodiments, the method includes displacing the pitch axis Xh away from the handling implement 150 before displacing the handling implement 150 (as well as the remainder of the suspended portion of the handler 100) away from the workpiece W. For example, as the suspender pivot 112 defining the pitch axis Xh is displaced away from the second balancing position B2 and toward the first balancing position B1, the pitch axis Xh is displaced away from the handling implement 150. In embodiments, the unclamping of the workpiece W may start upon or before displacing the pitch axis Xh away from the handling implement 150.

In embodiments, the method includes raising and/or lowering the handling implement 150 together with the workpiece W with the handling implement 150 (as well as the remainder of the suspended portion of the handler 100) and the workpiece W being balanced about at least the pitch axis Xh. In some embodiments, the raising and/or lowering is performed without the powered assistance by pivoting the handling implement 150 (as well as the remainder of the suspended portion of the handler 100) about the pitch axis Xh, for example via suitable pivoting of the input device 140 relative to the pitch axis Xh. In this case, the raising and/or lowering is nevertheless performed in a mechanically-assisted manner due to the zero-G loading conditions of the suspended portion of the handler 100 and the spacing of the input device 140 relative to the pitch axis Xh. In some embodiments, the raising and/or lowering includes translating the handling implement 150 (as well as the remainder of the suspended portion of the handler 100) and the workpiece W vertically with the powered assistance.

In embodiments, the method includes neutralizing the weight of the workpiece W relative to the pitch axis Xh with the powered assistance. As described hereinabove, this may be achieved by bringing the pitch axis Xh closer to the handling implement 150 with the workpiece W, thereby bringing the pitch axis Xh further from the input device 140. In some embodiments, neutralizing the weight of the workpiece W occurs before displacing the handling implement 150 (as well as the remainder of the suspended portion of the handler 100) together with the workpiece W.

Referring to FIGS. 1-4, 8-9 and 12, an exemplary use case of the powered handling system 1 will now be described. The workpiece W may be initially located at the first position $P_{W1}$ while the handler 100 is initially located remotely from the workpiece W. The suspender pivot 112 of the handler 100 may be initially located at the first balancing position B1 (FIG. 4), at which the unloaded center of gravity $CG_U$ is collocated with the suspender pivot 112 (and thus with the pitch axis Xh). As such, the suspended portion of the handler 100 (i.e. the body 120, the balancing mechanism 130, the input device 140, and the handling implement 150) is balanced with respect to the pitch axis Xh taking into account that the handling implement 150 is unloaded (i.e., taking into account that no onboard weight is supported by the handler 100 via the handling implement 150). The clamp 152 may be in the open clamp position (FIG. 8). The user U takes control of the handling system 1 via the input device 140 of the handler 100 by seizing the two handles 142, 142'. The user U may then action the input device 140 via corresponding controls 146, 146' to cause the positioning device 10 to displace the handler 100, and hence the handling implement 150, toward the first position $P_{W1}$ at which the workpiece W is initially located. The user U may walk with the handles 142, 142' in hand so as to follow movements of the handler 100 in the work environment E, including but not limited to movements in the horizontal plane defined by axes X, Y and/or vertical movements along the axis Z, as the user U controls the positioning device 10 to displace the handler 100. As the handling implement 150 (as well as the remainder of the suspended portion of the handler 100) nears the first position $P_{W1}$, the user U may make fine adjustments to the position of the handler 100 until the workpiece W is received by the clamp 152 inside the working volume V (FIG. 8). For example, adjustments to the height, or position along the axis Z, of the handler 100 may be made with powered assistance by auctioning the input device 140 via corresponding controls. Adjustments to the orientation of the handler 100 in the horizontal plane about the yaw axis Zh may be made without the powered assistance by moving the input device 140 to one side or the other. Adjustments to the orientation of the handling implement 150 (relative to the remainder of the suspended portion of the handler 100) about the roll axis Yh may be made with the powered assistance by auctioning the input device 140 via corresponding controls 146, 146'. Adjustments to the orientation of the suspended portion of the handler 100 about the pitch axis Xh may be made without the powered assistance by moving the input device 140 downwardly to raise the handling implement 150, or upwardly to lower the handling implement 150, a process that is eased due to the suspended portion of the handler 100 being balanced with respect to the pitch axis Xh. Once the workpiece W is received inside the working volume V of the clamp 152, the user U may action the input device 140 via corresponding controls 146, 146' to cause, with the powered assistance, the clamp 152 to move away from the open clamp position into a closed clamp position (FIG. 9) corresponding to a size of the workpiece W being clamped, and the suspender pivot 112 to move toward the handling implement 150 (and hence causing the pitch axis Xh to move toward the handling implement 150) to a balancing position, such as the second balancing position B2 (FIGS. 4 and 6), that is suitable for the weight of the workpiece W being clamped. In some embodiments, both the clamping of the clamp 152 and the displacement of the pitch axis Xh are caused via a single action of the user U. In the second balancing position B2, the loaded center of gravity $CG_L$ is collocated with the suspender pivot 112 (and thus with the pitch axis Xh). As such, the suspended portion of the handler 100 is balanced with respect to the pitch axis Xh taking into account that the handling implement 150 is loaded with the workpiece W (i.e., taking into account an onboard weight supported by the handler 100 via the handling implement 150). Upon the clamp 152 being in the closed clamp position and the pitch axis Xh being in the second balancing position B2, the orientation of the handling implement 150 (as well as the remainder of the suspended portion of the handler 100) about the pitch axis Xh with the workpiece W held by the handling implement 150 may be adjusted with ease by the user U without the powered assistance, here again by moving the input device 140 downwardly to raise the handling implement 150, or upwardly to lower the handling implement 150. Referring to FIG. 1, the user U may action the input device 140 via corresponding controls 146, 146' to displace the handler 100, and hence the handling implement 150 with the workpiece W, with the powered assistance toward the second position $P_{W2}$ at which the workpiece W is to be unloaded. As the workpiece W nears the second position $P_{W2}$, the user U may make fine adjustments to the position of the handler 100, with or without the powered assistance, until the workpiece W is suitably positioned to be unloaded. The user U may action the input device 140 via corresponding controls 146, 146' to cause, with the powered assistance, the suspender pivot 112 to move away from the handling implement 150 (and hence causing the pitch axis Xh to move away from the handling implement 150) to the first balancing position B1, and the clamp 152 to move away from the closed clamp position into the open clamp position (FIG. 8), thereby rendering the workpiece W free to be unloaded from the handling implement 150.

The embodiments described in this document provide non-limiting examples of possible implementations of the present technology. Upon review of the present disclosure, a person of ordinary skill in the art will recognize that changes may be made to the embodiments described herein without departing from the scope of the present technology. Such modifications may be implemented by a person of ordinary skill in the art in view of the present disclosure, which modifications would be within the scope of the present technology.

The invention claimed is:

1. A powered handler for handling a workpiece, the powered handler comprising:

a body extending between a first end and a second end;

an input device adjacent the first end of the body, the input device having one or more handles configured to be held by a user for manipulation of the powered handler for handling the workpiece;

a handling implement adjacent the second end of the body, the handling implement operatively connected to the input device and operable to handle the workpiece, the handling implement displaceable between an open position and a closed position by a handling actuator operated by one or more controls of the input device, the workpiece being engaged by the handling implement in the closed position; and a suspender having a proximate end mounted to the body at at least one pivot of the suspender defining a pitch axis of the powered handler, the body pivotable relative to the suspender about the pitch axis, the at least one pivot disposed between the input device and the handling implement and displaceable relative to the body to a balanced position located between a first position and a second position closer to the second end than the first position, the suspender having a distal end spaced upwardly from the body for mounting the suspender so as to suspend the body from the suspender.

2. The powered handler of claim 1, wherein the first position and the second position define a range of balancing positions including an unloaded balanced position at which the at least one pivot is collocated with a center of gravity of the powered handler without any onboard weight of the workpiece, and a loaded balanced position at which the at least one pivot is collocated with the center of gravity of the powered handler with an onboard weight of the workpiece.

3. The powered handler of claim 1, comprising a balancing mechanism operatively connected between the body and the suspender to displace the at least one pivot relative to the body, the balancing mechanism including a balancing actuator operable to displace the at least one pivot relative to the body.

4. The powered handler of claim 3, wherein the balancing actuator is operatively coupled to the handling actuator so as to displace the at least one pivot relative to the body upon the handling actuator displacing the handling implement.

5. The powered handler of claim 3, wherein the balancing mechanism includes at least one translational joint and the at least one pivot is slidably mounted to the body via the at least one translational joint.

6. The powered handler of claim 1, comprising a stopper for setting a range of displacement of the at least one pivot relative to the body between the first position and the second position.

7. The powered handler of claim 1, wherein the handling implement includes at least one of a clamp, an electromagnet, a hook, an anchoring loop and a fork.

8. The powered handler of claim 7, wherein the handling implement includes the clamp, the clamp having a first jaw and a second jaw, the second jaw being movable relative to the first jaw between an open clamp position in which the first and second jaws are at a first jaw distance from one another and a closed clamp position in which the first and second jaws are at a second jaw distance smaller than the first jaw distance, the first jaw distance being greater than a cross-sectional dimension of the workpiece.

9. The powered handler of claim 8, comprising a plurality of workpiece grips, each workpiece grip of the plurality of workpiece grips removably mountable to at least one of the first jaw and the second jaw, each workpiece grip of the plurality of workpiece grips having a grip shape conforming to a workpiece shape of the workpiece.

10. The powered handler of claim 8, wherein the first jaw and the second jaw define a clamp opening and the handling implement includes an abutment extending between the first jaw and the second jaw and facing toward the clamp opening, wherein the abutment is movable relative to at least one of the first jaw and the second jaw between a first abutment position in which the abutment extends between the first jaw and the second jaw at a first abutment distance from the clamp opening and a second abutment position in which the abutment extends between the first jaw and the second jaw at a second abutment distance from the clamp opening smaller than the first abutment distance.

11. The powered handler of claim 1, wherein the handling implement is rotatable relative to the body about a roll axis.

12. The powered handler of claim 1, wherein the input device includes at least one handle that is pivotable relative to the body about an axis parallel to the pitch axis.

13. The powered handler of claim 1, wherein the suspender includes a rotational joint located at the distal end, the rotational joint defining a yaw axis of the powered handler, the powered handler mountable via the rotational joint.

14. A powered handling system comprising the powered handler of claim 1, further comprising a positioning device including a base, at least one positioning link movably joined to the base and a positioning effector connected to the at least one positioning link, the positioning effector controllably positionable relative to the base via the at least one positioning link, the distal end of the suspender mounted to the positioning effector such that the powered handler is controllably positionable relative to the base, wherein the input device is connected to the positioning device such that a position of the positioning effector relative to the base is controllable via the input device.

* * * * *